US012583232B2

(12) United States Patent
Okamoto et al.

(10) Patent No.: US 12,583,232 B2
(45) Date of Patent: Mar. 24, 2026

(54) INKJET RECORDING APPARATUS AND INKJET RECORDING APPARATUS MANAGEMENT METHOD

(71) Applicant: Hitachi Industrial Equipment Systems Co., Ltd., Tokyo (JP)

(72) Inventors: Yusuke Okamoto, Tokyo (JP); Takahiro Arima, Tokyo (JP); Akira Miyao, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 135 days.

(21) Appl. No.: 18/682,151

(22) PCT Filed: Jun. 27, 2022

(86) PCT No.: PCT/JP2022/025597
§ 371 (c)(1),
(2) Date: Feb. 8, 2024

(87) PCT Pub. No.: WO2023/032442
PCT Pub. Date: Mar. 9, 2023

(65) Prior Publication Data

US 2024/0343045 A1 Oct. 17, 2024

(30) Foreign Application Priority Data

Aug. 30, 2021 (JP) ................................ 2021-139829

(51) Int. Cl.
*B41J 2/175* (2006.01)
*B41J 2/185* (2006.01)
*B41J 2/195* (2006.01)

(52) U.S. Cl.
CPC .......... *B41J 2/195* (2013.01); *B41J 2/17566* (2013.01); *B41J 2/17596* (2013.01); *B41J 2/185* (2013.01)

(58) Field of Classification Search
CPC ... B41J 2/01; B41J 2/07; B41J 2/16552; B41J 2/1707; B41J 2/175; B41J 2/17509;
(Continued)

(56) References Cited

U.S. PATENT DOCUMENTS

2010/0066790 A1* 3/2010 Kotabe .................... B41J 2/175 347/87
2017/0028736 A1 2/2017 Pourtier et al.
(Continued)

FOREIGN PATENT DOCUMENTS

JP 2007-062071 A 3/2007
JP 2019-123117 A 7/2019
(Continued)

OTHER PUBLICATIONS

International Search Report of PCT/JP2022/025597 dated Sep. 13, 2022.
(Continued)

*Primary Examiner* — Anh T Vo
(74) *Attorney, Agent, or Firm* — MATTINGLY & MALUR, PC

(57) ABSTRACT

An inkjet recording apparatus is made capable of preventing ink from sticking during inactivity of the apparatus and, when viscosity of ink contained in a main ink container has fallen outside an appropriate range of viscosity, adjusting ink viscosity to fall within the appropriate range. The apparatus is configured to perform repetitively supplying a solvent contained in a solvent container to the print head and letting the solvent flow back to an ink container through a circulation path and a collection path at intervals of a certain
(Continued)

period of time during inactivity of printing by the print head through controlling the print head and a main body.

14 Claims, 17 Drawing Sheets

(58) Field of Classification Search
CPC ................ B41J 2/17523; B41J 2/17566; B41J 2/17596; B41J 2/18; B41J 2/185
See application file for complete search history.

(56) References Cited

U.S. PATENT DOCUMENTS

| | | | |
|---|---|---|---|
| 2019/0217627 | A1 | 7/2019 | Arima et al. |
| 2020/0101741 | A1 | 4/2020 | Arima et al. |
| 2021/0178767 | A1 | 6/2021 | Kitamura et al. |

FOREIGN PATENT DOCUMENTS

| | | | |
|---|---|---|---|
| JP | 2019-166636 | A | 10/2019 |
| JP | 2020-049786 | A | 4/2020 |
| JP | 2021-014040 | A | 2/2021 |
| JP | 2021-062525 | A | 4/2021 |
| JP | 2021-091169 | A | 6/2021 |
| WO | 2018/030118 | A1 | 2/2018 |

OTHER PUBLICATIONS

Extended European Search Report received in corresponding European Application No. 22864030.6 dated Jun. 27, 2025.

Chinese Office Action received in corresponding Chinese Application No. 202280056591.7 dated Nov. 13, 2025.

* cited by examiner

INKJET RECORDING APPARATUS AND INKJET RECORDING APPARATUS MANAGEMENT METHOD

TECHNICAL FIELD

The present invention relates to an inkjet recording apparatus and a management method for the inkjet recording apparatus.

BACKGROUND ART

As inkjet recording apparatus for printing, or marking characters and shapes on products being carried by conveying equipment of a production line, i.e., the products being taken as objects on which a print is made, non-contact type ones are used that let flying ink particles drip on those objects without bringing a print head nozzle in contact with the objects. For instance, when printing characters or the like on a surface of a packing material such as a cardboard box in which merchandise was packed, a print is made by an inkjet recording apparatus on an external surface of the packing material being carried by a conveyor. Also, when printing on a container in which food or drink was kept, a print is made on an external surface of the container being carried by a conveyor.

A print head of such inkjet recording apparatus is provided with a charging electrode which gives an amount of charge as a function of printing information to ink particles spouted out from a nozzle and a deflecting electrode which deflects the charged ink particles and a gutter is disposed opposite to the nozzle to collect ink not used for printing. An ink supply path to supply ink in an ink container is connected to the nozzle and a collection path to collect ink collected by the gutter into the ink container makes a connection between the gutter and the ink container. Besides, a suction path makes a connection between an inflow port of the nozzle and the ink container to suck outside air into the nozzle and prevent nozzle clogging. Furthermore, a solvent supply path makes a connection between a solvent container and the nozzle for the purpose of cleaning the nozzle and each of the above-mentioned paths.

The inkjet recording apparatus also has its main body in which the ink container, the solvent container, and others are assembled and the print head is connected to the main body through cabling including an arrangement of hoses or the like that form the respective paths.

As an inkjet recording apparatus of prior art, "an inkjet recording apparatus comprising an ink container in which ink for printing on printing target objects is contained, a nozzle which is connected to the ink container and from which pressurized and supplied ink is discharged, a charging electrode which charges ink particles discharged from the nozzle, a deflecting electrode which deflects ink particles charged by the charging electrode, a gutter which collects ink not used for printing, a solvent container in which a solvent is contained, and a liquid nozzle which is connected to the solvent container and from which pressurized and supplied solvent is discharged, characterized in that the liquid nozzle has a liquid path part extending from the nozzle toward the gutter and a liquid outlet opening part formed at an angle to let the pressurized and supplied solvent flowing through the liquid path part spout out and hit against the nozzle" is disclosed in Patent Literature (PTL) 1.

Besides, "an inkjet recording apparatus comprising an ink container in which ink for printing on printing target objects is contained, a nozzle which is connected to the ink container and from which pressurized and supplied ink is discharged, a charging electrode which charges ink particles discharged from the nozzle, a charging signal generating unit which generates a changing signal to be applied to the charging electrode, a deflecting electrode which deflects ink particles charged by the charging electrode, a gutter which collects ink not used for printing, and a control unit which exerts control of overall operation, characterized by including a first charge detection means to detect an amount of change given to the ink particles by charging between the charging electrode and the deflecting electrode and a second charge detection means to detect an amount of charge of ink flowing into the gutter" is disclosed in PTL 2.

Furthermore, "an inkjet recording apparatus comprising a nozzle which spouts out ink particles that are generated, a charging electrode which charges the spouted out ink particles with a signal corresponding to characters or an image, a deflecting electrode to deflect the charged ink particles, a gutter which catches the ink particles not used for forming characters or an image, a main ink tank into which the ink particles caught by the gutter are returned for reuse of ink in forming characters or an image, an ink replenishment means which replenishes the main ink tank with replenishing ink as much as a quantity of ink consumed for forming characters or an image, an intensifier replenishment means which replenishes the main ink tank with an replenishing intensifier as much as a quantity of volatilized intensifier, and a liquid quantity detection means which detects a quantity of ink liquid accumulated in the main ink tank, characterized in that the liquid quantity detection means is capable of detecting a plurality of liquid levels including high, middle, and low levels and a liquid level to be detected is chosen depending on environmental temperature" is disclosed in PTL 3.

CITATION LIST

Patent Literature

PTL 1: Japanese Unexamined Patent Application Publication No. 2020-49786
PTL 2: Japanese Unexamined Patent Application Publication No. 2019-123117
PTL 3: Japanese Unexamined Patent Application Publication No. 2007-62071

SUMMARY OF INVENTION

Technical Problem

In an inactive state of an inkjet recording apparatus, a long continuing state in which no flow of ink and a solvent occurs may result in sticking of ink accumulated in a circulation path and there is a possibility that ink may not flow properly even after ink circulation is started when the apparatus is booted up.

When an inkjet recording apparatus is used for a long time, while printing and head cleaning are repeated, viscosity of ink in a main ink container changes and may fall outside an appropriate range of viscosity and the viscosity may become high or low.

In PTLs 1 to 3, there is no description about preventing ink from sticking when such inactivity of the apparatus continues long and adjusting ink viscosity to fall within an appropriate range in an event when viscosity of ink in the main ink container falls outside the appropriate range of viscosity.

The present invention solves problems associated with prior art mentioned above and provides an inkjet recording apparatus provided with configurations that enable it to prevent ink from sticking during inactivity and to adjust ink viscosity to fall within an appropriate range in an event when viscosity of ink in the main ink container has fallen outside the appropriate range of viscosity and a management method for such inkjet recording apparatus.

Solution to Problem

To solve the foregoing problems, in the present invention, an inkjet recording apparatus is configured as below: in the apparatus comprising a print head which is equipped with a nozzle to discharge ink and prints on printing target objects; a main body comprising an ink container in which ink to be supplied to the print head is contained, a solvent container in which a solvent is contained, a supply path to supply the ink from the ink container to the print head, a circulation path equipped with a pump for circulation to return a part of the ink supplied to the print head to the ink container, a collection path equipped with a pump for collection to suck the ink spouted out from the nozzle of the print head and collect the ink to the ink container, and a viscosity measurement unit which measures viscosity of the ink contained in the ink container; a head receptacle unit in which the print head is put in place; and a control unit which controls the print head and the main body; in an event when viscosity of the ink measured by the viscosity measurement unit has fallen outside a predetermined range set beforehand, the control unit controls the print head and the main body to make the viscosity of the ink fall within the predetermined range. To solve the foregoing problems, in the present invention, an inkjet recording apparatus is also configured as below: the apparatus comprising a print head which is equipped with a nozzle to discharge ink and prints on printing target objects; a main body comprising an ink container in which ink to be supplied to the print head is contained, a solvent container in which a solvent is contained, a supply path to supply the ink from the ink container to the print head, a circulation path to return a part of the ink supplied to the print head to the ink container, and a collection path to suck the ink spouted out from the nozzle of the print head and collect the ink to the ink container; and a control unit which controls the print head and the main body; during inactivity of printing on the printing target objects by the print head, the control unit controls the print head and the main body to perform repetitively supplying the solvent contained in the solvent container to the print head and letting the solvent flow back to the ink container through the circulation path and the collection path at intervals of a certain period of time during inactivity of printing by the print head.

Advantageous Effects of Invention

According to the present invention, supplying a solvent to the print head and spouting out the solvent from the nozzle allow liquid to pass through a circulation path;

this leads to capability to improve effectiveness of sticking prevention.

According to the invention, moreover, an inkjet recording apparatus is made capable of adjusting viscosity of ink in a main ink container automatically, covering a high viscosity event and a low viscosity event.

DESCRIPTION OF EMBODIMENTS

The present invention was contrived to makes it possible to supply a solvent to the print head and spout out the solvent from the nozzle, thus allowing liquid to flow through a circulation path upon every elapse of a certain period of time during an inactive state of an inkjet recording apparatus.

Besides, in an event when ink viscosity has fallen outside a predetermined range, the present invention was contrived to make it possible for the inkjet recording apparatus to perform viscosity adjustment automatically depending on whether the viscosity is high or low.

Besides, in an event when ink viscosity has become higher than a predetermined range, the present invention was contrived to make it possible for the inkjet recording apparatus to adjust the ink viscosity to fall within an appropriate range, whereas only a part of ink contained in the main ink container has to be discarded depending on the ink viscosity. Therefore, the invention was contrived to eliminate the need to discard all the ink contained in the main ink container and replace it with new ink and to make it possible to increase the effective usage amount of ink with reduced amount of discarded ink.

Hereinafter, an embodiment of the present invention is described in detail based on the drawings. Across all the drawings to explain an embodiment disclosed herein, an identical reference sign is assigned to components having the same function and repetitive descriptions of such components are omitted in principle.

It should be noted that the present invention should not be construed to be limiting to the description of an embodiment that is set forth hereinafter. It will be appreciated easily by those skilled in the art that specific configurations and components of the invention may be modified without deviating from the concept or gist of the present invention.

Embodiment 1

<Usage>

Figure 1:
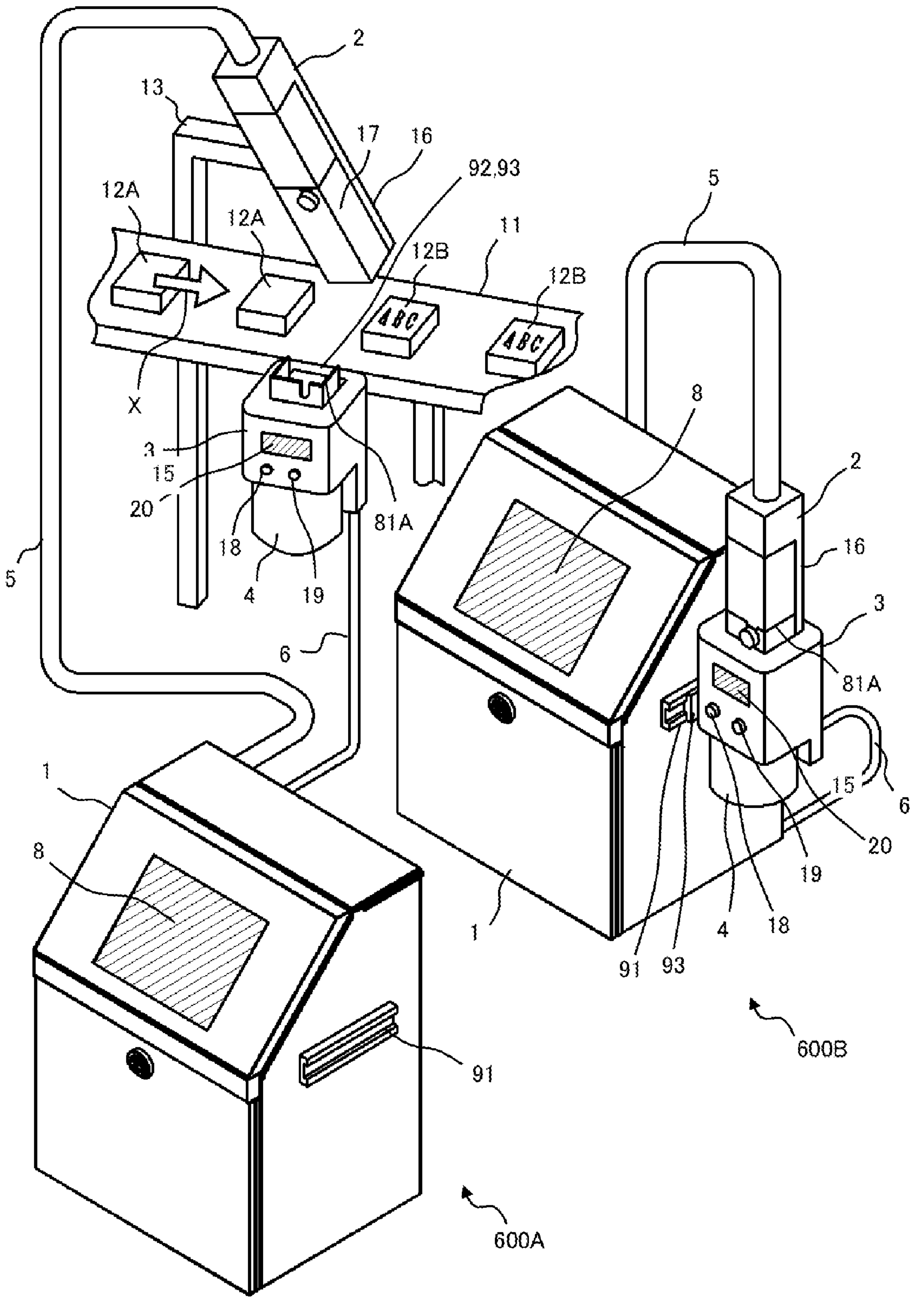
FIG. 1 is a perspective view depicting how an inkjet recording apparatus according to an embodiment disclosed herein is used.

First, with FIG. 1, descriptions are provided about how an inkjet recording apparatus according to Embodiment 1 of the present invention is used. FIG. 1 is a perspective view depicting how the inkjet recording apparatus according to Embodiment 1 of the present invention is used.

A pair of inkjet recording apparatuses 600A and 600B depicted in FIG. 1 has the same configuration and each one is equipped with a main body 1, a print head 2 connected to the main body 1 with a cable (for the print head) 5, and a head receptacle unit 3 connected to the main body 1 with a cable (for the head receptacle unit) 6. Here, the head receptacle unit 3 basically has a function of housing the print head and, also, a function of cleaning the print head by spouting a cleaning solution to it may be added thereto.

The head receptacle unit 3 which will be described hereinafter is configured with the addition of the function of cleaning the print head. One inkjet recording apparatus 600A is depicted with the print head 2 being set up beside a production line. The other inkjet recording apparatus 600B is depicted with the print head 2 being removed from the production line and put (set) in place in the head receptacle unit 3.

Additionally, a collection container 4 which is attached to the bottom of the head receptacle unit 3 is provided to receive liquid (a cleaning solution) after the print head is cleaned within the head receptacle unit 3.

The inkjet recording apparatus 600A is installed aside a production line in a factory where, e.g., food, beverages, etc. are produced and the main body 1 is set up in a place where an enough space required for, inter alia, a periodical maintenance operation is available. The print head 2 is fixed to a print head fixing bracket 13 set up beside a belt conveyor 11 and disposed in close proximity to the conveyor to make a print on printing target objects 12A, 12B which are carried in a direction of arrow X on the production line such as the belt conveyor 11. Besides, a protective cover 17 is installed on the print head 2 in order to protect internal parts of the print head 2. Note that printing target objects 12B are depicted as those being transported on the belt conveyor 11 after a print has been made on them by the print head 2.

In addition, the main body 1 in FIG. 1 has a reservoir inside it to accommodate (preserve) ink for printing and supplies ink to the print head 2 through the cable (for the print head) 5 by controlling its internal drive components (pumps and solenoid valves). Also, path configurations inside the main body 1 and a control unit will be detailed later. An operating and display unit 8 is set up on an upper side of the main body 1 and a touch-input display panel is used for it here. Through touch interactions with the operating and display unit 8, an operator can command the control unit to start or stop the apparatus, set what is to be printed on the printing target objects 12A, and display information on ink viscosity before and after an adjustment is made. Besides, a head base of the print head 2 is marked with a reference sign 16 in FIG. 1.

The head receptacle unit 3 is set up in vicinity of the print head 2. The head receptacle unit 3 of the inkjet recording apparatus 600A is fixed by engaging a fitting part 93 assembled to the head receptacle unit 3 with a fixing jig 92 assembled to the belt conveyor 11. Furthermore, the head receptacle unit 3 includes a head holding part 81A for putting the print head 2 in place. The head receptacle unit 3 further includes a start button 18 for starting a process of cleaning the print head 2, a stop button 19 for stopping the process of cleaning the print head 2, and a display 15 for allowing a worker to be aware of a confirmation message and an alarm of warning, abnormality, or the like. This display 15, for example, may light on/off or light in different colors to allow a worker to be aware of an operating status or whether or not abnormality occurs.

For the inkjet recording apparatus 600A of the embodiment disclosed herein, its head receptacle unit 3 is situated stationary near the belt conveyor 11; however, the head receptacle unit 3 can be re-installed freely in a place where it is easy to operate by the user. In this regard, it is preferable to make the length of the cable (for the head receptacle unit) 6 connecting the main body 1 and the head receptacle unit 3 equal to or longer than the length of the cable 5 connecting the main body 1 of the inkjet recording apparatus 600 and the print head 2. This is intended to ensure an adequate degree of freedom of where to install the head receptacle unit.

The main body 1 also has a fixing part 91 for securing the head receptacle unit 3 and the head receptacle unit 3 can also be used in such a way as to remove the head receptacle unit 3 from the fixing jig (for the conveyor) 92 and re-install it in the fixing part 91. The inkjet recording apparatus 600B is depicted in a state when the head receptacle unit is installed to it.

The inkjet recording apparatus 600B is depicted in a state when the head receptacle unit 3 is secured to the main body 1 by engaging its fitting part 93 with the fixing part 91 assembled to the main body 1. By allowing the head receptacle unit 3 to be secured to the main body 1, the head receptacle unit 3 can be seated in place, even if there is no space to install the head receptacle unit 3, inter alia, in proximity to the belt conveyor 11.

Then, an explanation is provided with regard to a state in which the print head 2 is set in place in the head receptacle unit 3 of the inkjet recording apparatus 600B. The print head 2 is inserted into the head holding part 81A of the head receptacle unit 3 from its forward end and the print head 2 is set in place. By thus setting the print head 2 in place in the head receptacle unit 3, the inkjet recording apparatus 600B according to the embodiment disclosed herein enables cleaning of the print head 2 with a solvent 69A that is supplied from the main body 1 side via the cable (for the head receptacle unit) 6.

Likewise, the inkjet recording apparatus 600A enables cleaning of the print head 2 also in a state when the print head 2 is set in place in the head receptacle unit 3 that is fixed by engaging its fitting part 93 with the fixing jig 92 assembled to the belt conveyor 11.

<Path Configurations>

Figure 2:
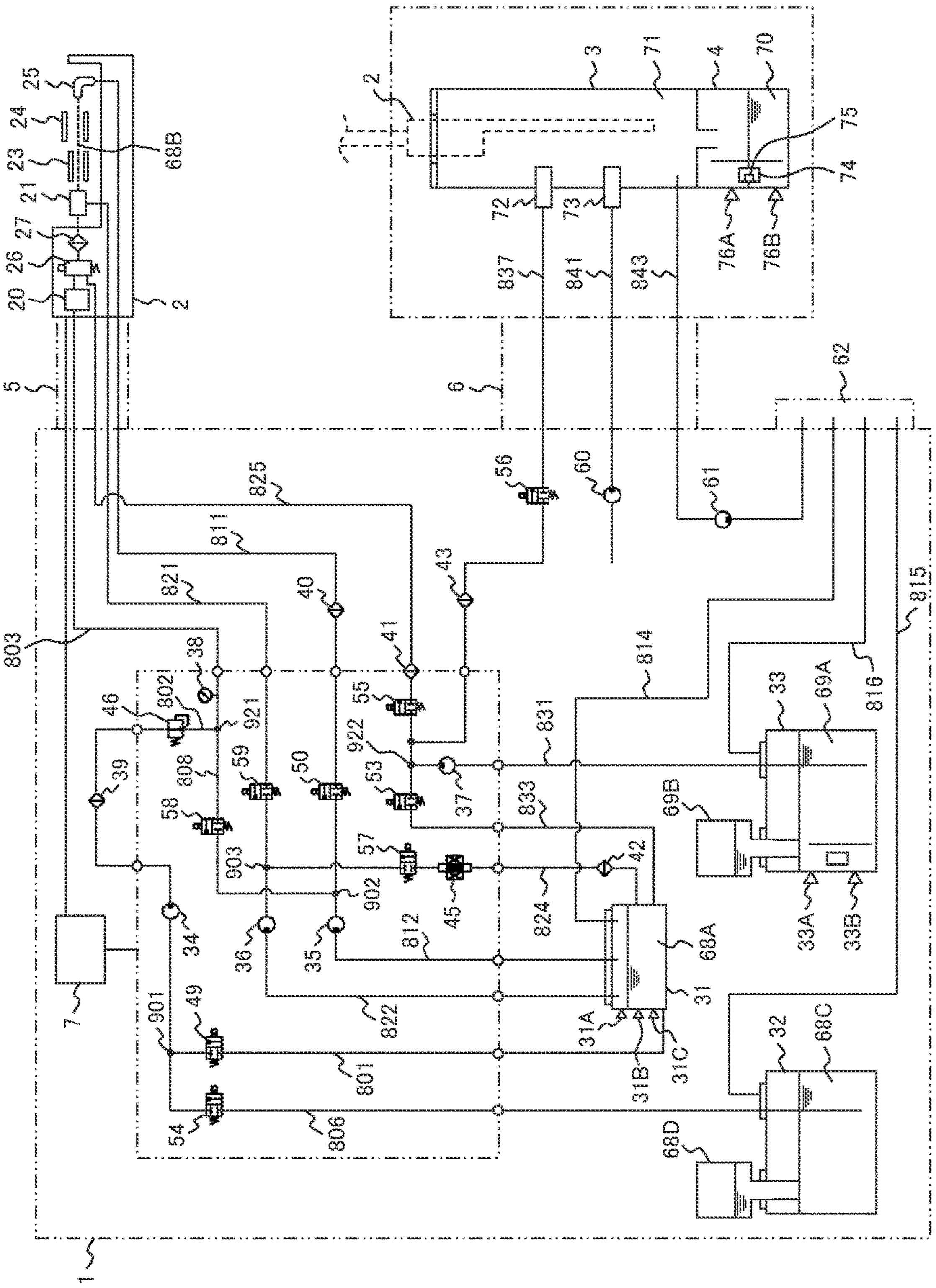
FIG. 2 is path diagram depicting a configuration of paths through which ink or a solvent flows in the inkjet recording apparatus according to the embodiment disclosed herein.

Then, with FIG. 2, descriptions are provided about path configurations in the inkjet recording apparatus 600 (the inkjet recording apparatus 600A and the inkjet recording apparatus 600B depicted in FIG. 1 are collectively termed as the inkjet recording apparatus 600) according to Embodiment 1. FIG. 2 is a diagram depicting an overall path configuration in the inkjet recording apparatus 600 according to the embodiment disclosed herein.

First, descriptions are provided about ink supply paths (paths 801 to 803) in the inkjet recording apparatus 600 according to Embodiment 1. According to FIG. 2, the main body 1 is equipped with a main ink container 31 which preserves ink 68A for printing. The main ink container 31 is equipped with a liquid level sensor 31A (a sensor 1) which detects a condition that the liquid (ink 68A) in the main ink container 31 exceeds a reference liquid level indicative of an appropriate amount for being preserved inside, a liquid level sensor 31B (a sensor 2) which detects whether or not the liquid reaches the reference liquid level indicative of the appropriate amount, and a liquid level sensor 31C (a sensor 3) which detects the termination of discarding a certain amount of the ink from the main ink container 31.

The main ink container 31 is connected with a path (for supply) 801 in its portion filled with the ink 68A and a solenoid valve (for supply) 49 which opens and closes the path is installed in the middle of the path 801. The path 801 is then connected with a pump (for supply) 34 which is installed in a path 802 and used to suck and pump the ink 68A via a joint path 901. The path is in turn connected with a filter (for supply) 39 which removes foreign matters mixed in the ink 68A at the output side of the pump (for supply) 34.

The filter (for supply) 39 is connected with a pressure regulating valve 46 which regulates the pressure of the ink 68A pumped out from the pump (for supply) 34 to be suitable for printing and the pressure regulating valve 46 is connected with a pressure sensor 38 which measures the pressure of the ink 68A being supplied to a nozzle 21. The path 802 in which the pressure regulating valve 46 is located is connected with a path 803 passing through the cable (for the print head) 5 via a branch path 921 and the path 803 is connected with a solenoid valve for switchover 26 which is provided inside the print head 2 and serves to control whether to supply the ink 68A to the nozzle 21.

Just before the solenoid valve (for switchover) 26, a heater 20 is installed which serves to raise the temperature of the ink 68A being supplied to the nozzle 21 to an optimal temperature. The heater 20 is internally equipped with a temperature sensor, which is not depicted, for control in raising the ink temperature.

The solenoid valve (for switchover) 26 is connected with the nozzle 21 to discharge the ink 68A via a filter 27. The solenoid valve (for switchover) 26 is a three-way solenoid valve. The path 803 for ink supply and a path 825 for nozzle cleaning are connected to the solenoid valve (for switchover) 26 and this valve is able to switch over between the ink 68A and a solvent 69A being supplied to the nozzle 21. In a straight direction in which ink particles 68B are discharged from the nozzle 21, a charging electrode 23 to apply a predetermined charge amount to the ink particles 68B, a deflecting electrode 24 to deflect the ink particles 68B for use for printing, and a gutter 25 to catch ink particles 68B flying straight without being charged and deflected, as they are not used for printing, are arranged in place.

Then, descriptions are provided about paths 811 and 812 for ink collection in the inkjet recording apparatus 600. According to FIG. 2, the gutter 25 is connected with a path 811 and a charge sensor 48 is located in the path 811 to detect whether there are collected ink particles 68B to which a charge amount was applied by the charging electrode 23. In turn, the path 811 passes through the cable (for the print head) 5 and is connected with a filter (for collection) 40 which is located inside the main body 1 and removes foreign matters mixed in the ink and the filter (for collection) 40 is connected with a solenoid valve (for collection) 50 which opens and closes the path.

The solenoid valve (for collection) 50 is connected with a pump (for collection) 35 which is located in a path 812 connected via a joint path 902 and suctions the ink particles 68B caught by the gutter 25. The pump (for collection) 35 is connected to the main ink container 31. By opening the solenoid valve 50 and driving the pump (for collection) 35, the ink particles 68B caught by the gutter 25 are collected into the main ink container 31 through the path 811 and the path 812.

Then, descriptions are provided about an exhaust path (a path 814) in the inkjet recording apparatus 600 according to the embodiment disclosed herein. The exhaust path is configured such that one end of the path 814 is connected to the main ink container 31 in an upper space not contacting the ink 68A in the container and the other end of the path 814 is connected to an exhaust duct connection port 62 communicating with space outside the main body 1.

Then, descriptions are provided about ink circulation paths (paths 821 to 822) in the inkjet recording apparatus 600 according to the embodiment disclosed herein. The nozzle 21 provided inside the print head 2 is connected with a path 821 passing into and through the cable (for the print head) 5 besides the path through which the ink 68A is supplied via the filter 27. In this path 821, a solenoid valve (for circulation) 59 which is provided inside the main body 1 and opens and closes the path (flow path) is located. The solenoid valve (for circulation) 59 is connected with a path 822 via a joint path 903 and a pump (for circulation) 36 which suctions the ink from the nozzle 21 is located in the path 822. Circulation is configured such that the pump (for circulation) 36 is in turn connected to the main ink container 31 through the path 822.

Then, descriptions are provided about paths (paths 824 to 822) for viscosity measurement in the inkjet recording apparatus 600 according to the embodiment disclosed herein. According to FIG. 2, the main ink container 31 is connected with a path (for viscosity measurement) 824 in its portion filled with the ink 68A.

The path (for viscosity measurement) 824 is connected with a filter (for viscosity measurement) 42 to remove foreign matters mixed in the ink 68A being supplied from the main ink container 31 and also with a viscosity measuring instrument (a viscometer) 45 to determine viscosity of the ink 68A in the main ink container 31.

The viscosity measuring instrument (a viscometer) 45 is connected with a solenoid valve (for viscosity measurement) 57 which opens and closes the path. The path is configured such that the solenoid valve (for viscosity measurement) 57 is connected with the pump (for circulation) 36 located in the path 822 via the joint path 903.

This path configuration allows the ink 68A in the main ink container 31 to circulate through the viscosity measurement path and enables it to measure viscosity of the ink 68A with the viscosity measuring instrument (viscometer) 45. Information on viscosity measured in this way is input to the control unit 7 and will be used for control of viscosity of the ink 68A in the main ink container 31.

Then, descriptions are provided about solvent resupply paths (paths 831 and 833) in the inkjet recording apparatus 600 according to the embodiment disclosed herein. According to FIG. 2, the main body 1 is equipped with a solvent container 33 which preserves a solvent 69A for use for resupplying the solvent to the main ink container 31 and for cleaning the nozzle or the head. In the solvent container 33, a solvent cartridge 69B containing solvent for resupply is put in place.

The solvent container 33 is connected with a path 831 in its portion filled with the solvent 69A and a pump (for solvent) 37 which is used to suck and pump the solvent is located in the path 831. Furthermore, the pump (for solvent) 37 is connected with a branch path 922 to change the destination to which the solvent 69A is supplied depending on the purpose.

Path configuration for resupply of the solvent is such that the branch path 922 is connected with a solenoid valve (for resupply of solvent) 53 located in a path 833 to open and close the path and the solenoid valve (for resupply of solvent) 53 is connected to the main ink container 31 through the path 833. Using these paths 831 and 833, control of viscosity of the ink 68A in the main ink container 31 is performed under control of the control unit 7.

Moreover, a path 816 for exhaust makes a connection between the solvent container 33 and the exhaust duct connection port 62 to discharge evaporated solvent outside in a case when the solvent 69A evaporates inside the solvent container 33 and the internal pressure of the solvent container 33 rises.

Then, descriptions are provided about a path 806 for resupply of ink in the inkjet recording apparatus 600 according to the embodiment disclosed herein. According to FIG. 2, the main body 1 is equipped with an auxiliary ink container 32 which preserves ink 68C for replenishment. In the auxiliary ink container 32, an ink cartridge 68D containing ink for replenishment is put in place.

The auxiliary ink container 32 is connected with the path 806 in its portion filled with the ink 68C. The path 806 is connected with a solenoid value (for resupply of ink) 54 which opens and closes the path and the solenoid value (for resupply of ink) 54 is connected with the pump (for supply) 34 which is installed in the path 802 and used to suck and pump the ink 68C via the joint path 901. Thus, in a state when the solenoid value (for resupply of ink) 54 is opened and the solenoid valve (for supply) 49 is closed, the ink 68C in the auxiliary ink container 32 flows through the paths 802, 803 and is spouted out from the nozzle 21, and then flows via the gutter 25, the path 811, the solenoid valve 50, and the pump 35 to the main ink container 31, so that the main ink container 31 will be replenished with this ink.

Moreover, a path 815 for exhaust makes a connection between the auxiliary ink container 32 and the exhaust duct connection port 62 to discharge evaporated solvent outside in a case when solvent in the ink 68C evaporates inside the auxiliary ink container 32 and the internal pressure of the auxiliary ink container 32 rises.

Then, descriptions are provided about nozzle cleaning paths (paths 831 and 825) in the inkjet recording apparatus 600 according to the embodiment disclosed herein. According to FIG. 2, a pump (for solvent) 37 located in the path 831 is connected with the path 825 via a branch circuit 922. The path 825 is connected with a solenoid valve (for nozzle cleaning) 55 to open and close the path. Furthermore, the solenoid valve (for nozzle cleaning) 55 is connected with a filter (for nozzle cleaning) 41 to remove foreign matters mixed in the solvent 69A. Path configuration is such that the filter (for nozzle cleaning) 41 is connected to the solenoid valve (for switchover) 26 which is provided inside the print head 2 and serves to control whether to send the solvent 69A for cleaning to the nozzle 21 through the path 821 passing into and through the cable (for the print head) 5.

Then, descriptions are provided about circulation paths in the main body (paths 808 and 812) in the inkjet recording apparatus 600 according to the embodiment disclosed herein. The path 802 is connected with a path 808 via the branch path 921. The path 808 is connected with a solenoid valve (for circulation in the main body) 58 and the solenoid valve (for circulation in the main body) 58 is connected with the pump (for collection) 35 installed in the path 812 via the joint path 902.

Then, descriptions are provided about head cleaning paths (paths 831 and 837) in the inkjet recording apparatus 600 according to the embodiment disclosed herein. According to FIG. 2, the pump (for solvent) 37 is connected with a path 837 via the branch path 922, a solenoid valve (for head cleaning) 56 to open and close the path is located in the path 837, and the solenoid valve (for head cleaning) 56 is connected with a filter (for head cleaning) 43 which removes foreign matters mixed in the solvent 69A.

The collection container 4 attached to the head receptacle unit 3 is provided to store a cleaning solution (solvent) spouting out from a cleaning nozzle 72 fixed into a cleaning bath 71 of the head receptacle unit 3 after the head is cleaned with the solution. Inside the collection container 4, a float 74 with a built-in magnet is provided to detect the liquid level of the solvent after cleaning. Magnetic sensors 76A and 76B and a magnet 75 are installed to the periphery of the collection container 4 to detect a quantity of the solvent stored inside the collection container 4. When the float 74 with the built-in magnet 75 has moved up to a predetermined liquid level, a magnetic sensor 76A detects magnetism of the magnet 75 built in the float 74 and outputs a signal indicating that the cleaning solution in the collection container 4 has reached the predetermined liquid level to the control unit 7.

Then, descriptions are provided about an air supply path (a path 841) in the inkjet recording apparatus 600 according to the embodiment disclosed herein. According to FIG. 2, the main body 1 is equipped with a pump (for drying) 60 which is used to suck and pump air and the pump (for drying) 60 has an air suction port formed therein communicating with the interior of the main body 1. The pump (for drying) 60 is connected to the head receptacle unit 3 through the path 841 passing into and through the cable (for the head receptacle unit) 6.

Then, descriptions are provided about an air suction path (a path 843) in the inkjet recording apparatus 600 according to the embodiment disclosed herein. To the cleaning bath 71 provided inside the head receptacle unit 3, a pump (for suction) 61 which is provided inside the main body 1 and used to suck and pump air is connected through the path 843 passing into and through the cable (for the head receptacle unit) 6. Path configuration is such that the pump (for suction) 61 is in turn connected to the exhaust duct connection port 62 communicating with space outside the main body 1.

<Configuration of the Control Unit>

Figure 3:
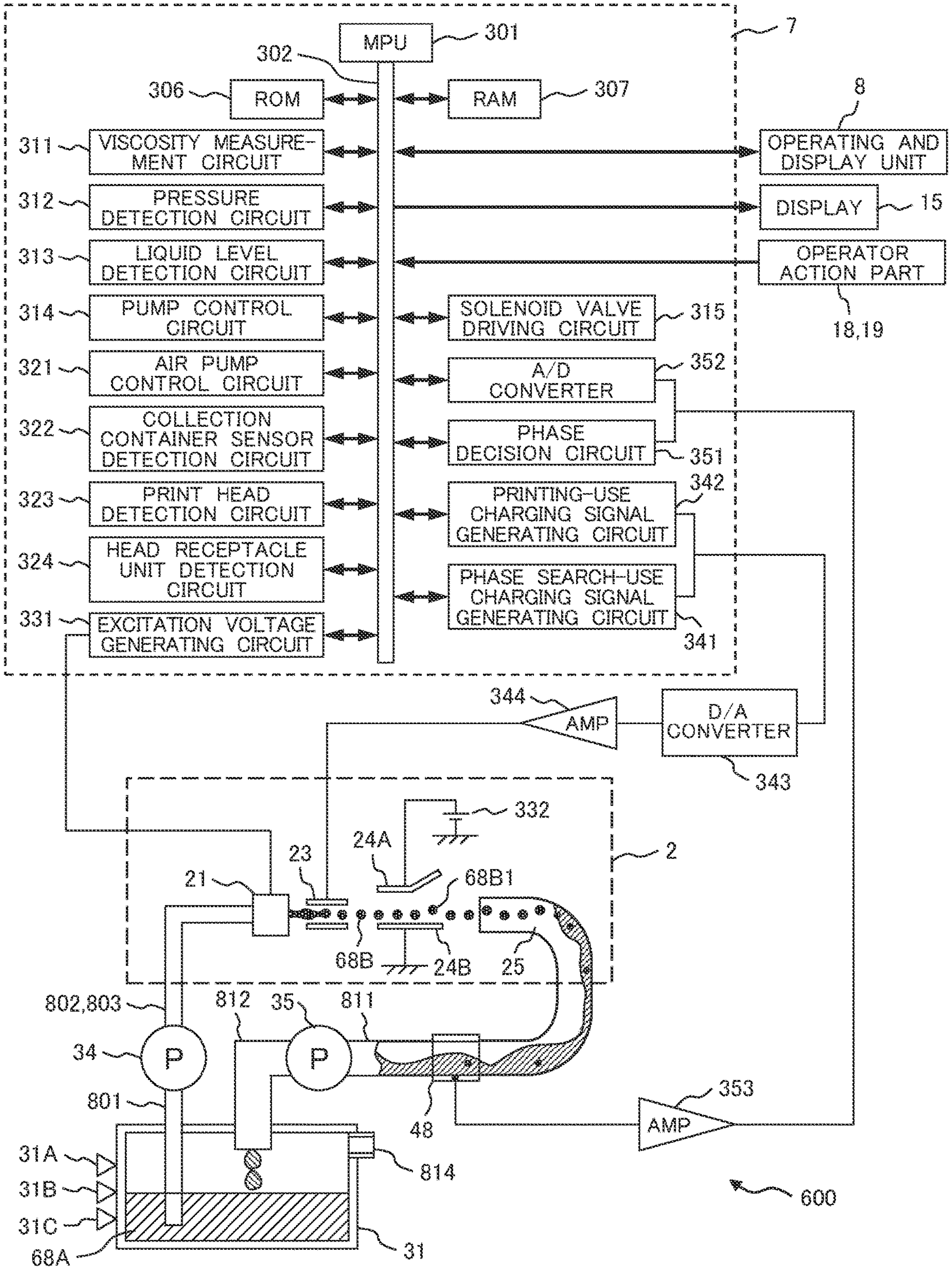
FIG. 3 is a block diagram depicting a configuration of the control unit of the inkjet recording apparatus according to the embodiment disclosed herein.

Next, explanations are provided about the configuration of the control unit 7 of the inkjet recording apparatus 600 according to the embodiment disclosed herein. FIG. 3 is a diagram depicting the schematic configurations of the control unit 7 of the inkjet recording apparatus 600 of the embodiment disclosed herein and a printing mechanism section (the main body 1 and the print head 2). 301 in FIG. 3 is a micro processing unit (hereinafter referred to as MPU) that is a controller exerting overall control of the inkjet recording apparatus 600.

302 is a bus line that has a function of transmitting data, control signals, etc. between respective hardware components constituting the control unit. For example, the bus line 302 is used to input data, a detection signal, etc. required for computing operations of the MPU 301 from a hardware component and transmit a data signal, an address signal, and a control signal to a hardware component.

306 is a readonly memory (ROM) storing programs and data for control which are required for the MPU 301 to operate. 307 is a random access memory (RAM) storing data temporarily required during program execution by the MPU 301. 8 is the operating and display unit via which what is to be printed, setting values, etc. are input and which displays, inter alia, data and what is to be printed which have been input. As this operating and display unit 8, a touch-input display panel with transparent touch switches superimposed on the surface of a liquid crystal display screen is used here.

Besides, while the head receptacle unit 3 can be controlled via the operating and display unit 8 of the control unit 7, an operator action part (with the start button 18 and the stop button 19) is used when an operator controls an operation regarding the head receptacle unit 3 near the head receptacle unit 3, but not via the operating and display unit 8. Then, the display 15 is used when an operator checks an operating status, an abnormality message, etc. with regard to the head receptacle unit 3 near the head receptacle unit 3, but not via the operating and display unit 8.

The print head 2 of the inkjet recording apparatus 600 is equipped with the nozzle 21 which discharges the ink 68A that has been pressurized and supplied from the main ink container 31 and turns into particles. The nozzle 21 spouts out the ink in a columnar form with a tip coming apart, then the ink is discharged as ink particles 68B. The print head 2 is also equipped with the charging electrode 23 which is placed to surround the ink particles 68B and charges the ink particles 68B according to what is to be printed.

Furthermore, the print head 2 deflects flying ink particles 68B charged by the charging electrode 23 depending on their charge amount and makes the ink particles fly toward an object on which a print is made (not depicted). Then, printing is performed by letting the flying ink particles fall on the object on which a print is made. The deflecting electrode 24 of the print head 2 is comprised of a ground electrode 24B and a positive electrode 24A. The print head 2 is also equipped with the gutter 25 which catches ink particles 68B not used for printing (non-used ink) and the charge sensor 48 which generates a phase detection signal depending on the charge amount of ink particles 68B1 taking a few amount of charge among the ink particles 68B caught by the gutter 25. Then, the main body 1 side is equipped with the pump (for collection) 35 to collect the ink (ink particles) caught by the gutter 25 into the main ink container 31 and the paths 811, 812 for ink collection connecting the gutter 25 and the main ink container 31.

Furthermore, the control unit 7 includes an excitation voltage generating circuit 331 which excites an electrostrictive element (not depicted) incorporated in the nozzle 21 in order to give regularity to timing at which an ink column spouted out from the nozzle 21 comes apart into ink particles 68B.

The control unit 7 also includes a printing-use charging signal generating circuit 342 and a phase search-use charging signal generating circuit 341 and includes a D/A converter 343 which converts a charging signal in a digital signal form which is output from these circuits to a voltage signal in an analog form and an amplifier circuit 344 which amplifies a voltage signal in an analog signal form which is output from the D/A converter 343 and generates a charging voltage to be applied to the charging electrode 23. Note that, instead of a configuration provided with the printing-use charging signal generating circuit 342 and the phase search-use charging signal generating circuit 341, there may be an implementation through a charge amount control by the control unit using only the printing-use charging signal generating circuit 342. The inkjet recording apparatus 600 is also equipped with a deflection voltage generating circuit 332 which generates a deflection voltage to be applied to the deflecting electrode 24.

The inkjet recording apparatus 600 is also equipped with an amplifier circuit 353 which amplifies a phase detection signal in an analog signal form which is output from the charge sensor 48, a phase decision circuit 351 which takes input of an amplified phase detection signal and decides whether or not a charged quantity is acceptable, and an A/D converter 352 takes input of an amplified phase detection signal and performs A/D conversion.

Then, according to FIG. 3, through the bus line 302, the MPU 301 of the control unit 7 is connected with and controls an liquid level detection circuit 313 for management of the liquid level of the main ink container 31, a pressure detection circuit 312 to detect whether the pressure of the ink being supplied to the nozzle 21 is an appropriate value, a viscosity measurement circuit 311 for measuring whether viscosity of the ink 68A being supplied to the nozzle 21 is an appropriate value for printing with the viscosity measuring instrument 45, a pump controlling circuit 314 to control the respective pumps 34 to 37 which suction and pump the ink 68A and the solvent 69A and are deployed inside the main body 1, and a solenoid valve driving circuit 315 to control an open/close operation of the respective solenoid valves 49 to 50 and 53 to 59 in the respective paths.

Through the bus line 302, the MPU 301 is also connected with and is to control a pump control circuit 321 to control the pumps 60 and 61, a collection container sensor detection circuit 322 to detect that the collection container 4 is attached to the head receptacle unit 3 and that liquid 70 in the collection container 4 is not more than a predetermined quantity using the magnetic sensor 76A and the magnet 75, a print head detection circuit 323 to detect that the print head 2 is put in place in the head receptacle unit 3, and a head receptacle unit detection circuit 324 to detect that the print head 2 is put in place in the head receptacle unit 3.

Additionally, a computer can be used as the control unit 7. Specifically, the control unit 7 can be made up of the MPU 301, the memories (306 and 307) to store programs for operation of the MPU 301 and data and information necessary for operation, and drive components to cause the print head 2, the head receptacle unit 3, and the hardware components within the main body 1 to operate, as instructed by the MPU 301. Detailed descriptions on the control unit 7 are omitted here.

<Operation for Preventing Sticking During Inactivity>

With FIGS. 4 through 7, descriptions are provided about an operation for preventing ink from sticking to be performed in a state when the print head 2 is put in place in the head receptacle unit 3 during inactivity of printing by the print head 2.

Figure 4:
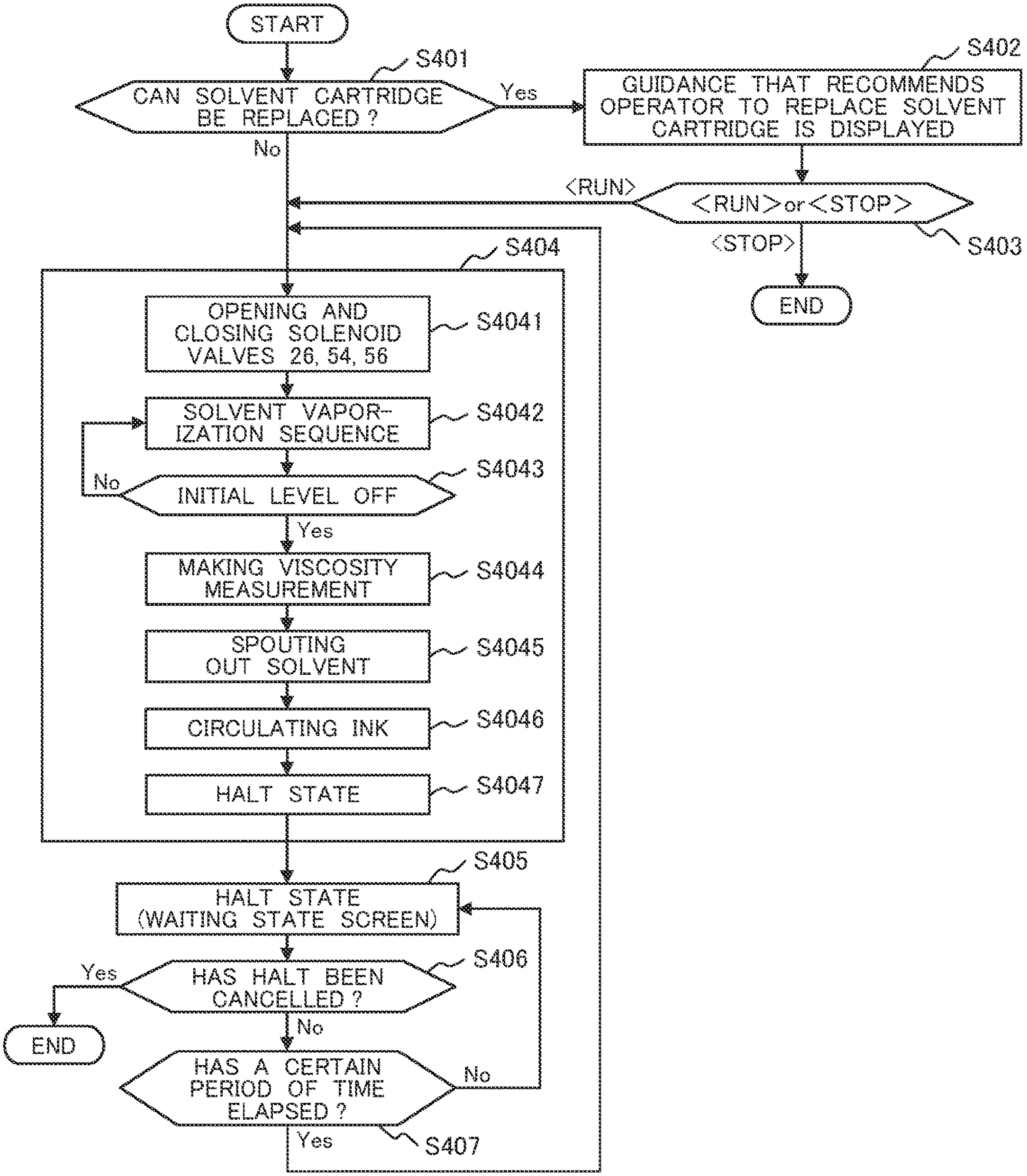
FIG. 4 is a flowchart of processing for preventing ink sticking in the inkjet recording apparatus according to the embodiment disclosed herein.

A processing flow of the operation for preventing ink sticking is depicted in FIG. 4. In an inactive state of printing by the print head 2, first, the MPU 301 of the control unit 7, based on the stored control program, checks how much the solvent 69A for cleaning the print head 2 is in the solvent container 33 from the signal of the level sensor 33A and 33B and checks whether the solvent cartridge 69B containing solvent that is supplied as the solvent 69A to the solvent container 33 can be replaced (S401).

If the level sensor 33B makes no detection of the solvent 69A in the solvent container 33, the MPU 301 decides that the solvent cartridge 69B can be replaced (Yes at S401), as there is a small amount of the solvent 69A in the solvent container 33, and the processing goes to S402. Otherwise, if the level sensor 33A makes detection of the solvent 69A in the solvent container 33, the MPU 301 decides that the solvent cartridge 69B cannot be replaced (No at S401), as there is a sufficient amount of the solvent 69A in the solvent container 33, and the processing goes to a sticking prevention step (S404).

When a decision that the solvent cartridge 69B can be replaced has been made at S401 (Yes at S401), the processing goes to S402 where a guidance that recommends an operator to replace the solvent cartridge 69B is displayed on the display 15 and the operating and display unit 8, as instructed by the MPU 301. In a state when the solvent cartridge 69B has been replaced according to the guidance, when the operator touches a Stop button (not depicted) that appears on the display unit 15 and the operating and display unit 8 at S403, the sticking prevention operation is stopped.

Otherwise, when the operator touches a Run button (not depicted) that appears on the display unit 15 and the operating and display unit 8 at S403, the processing goes to the sticking prevention step (S404).

In the sticking prevention step (S404), first, the MPU 301 controls the solenoid valve driving circuit 315 to open and close the solenoid valve (for resupply of ink) 54, the solenoid valve (for switchover) 26, and the solenoid valve (for head cleaning) 56 repetitively (S4041) to prevent ink deposited to the solenoid valves 54, 26, and 56 from sticking with which the solenoid valves 54, 26, and 56 do not open and close smoothly.

Figure 5:
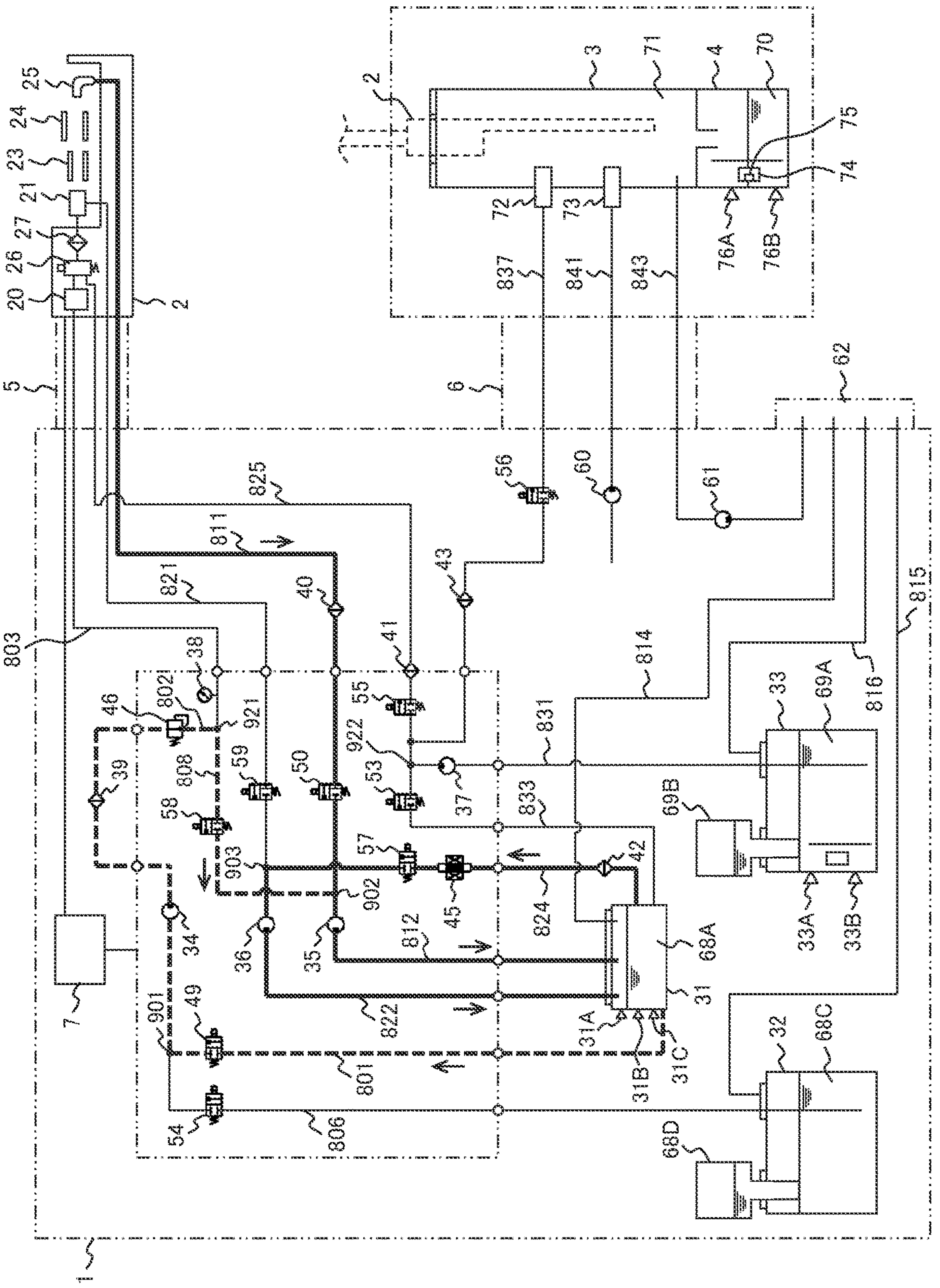
FIG. 5 is a path diagram depicting paths through which ink flows when ink viscosity is measured in the processing for preventing ink sticking in the inkjet recording apparatus according to the embodiment disclosed herein.

Next, in a solvent vaporization sequence (S4042), the MPU 301 controls the pump control circuit 314 to actuate the pump (for collection) 35 and, in the meantime, the solenoid valve (for collection) 50 is opened to suck air from the gutter 25 so that the air will be supplied through the paths (for collection) 811 and 812 into the main ink container 31, as is depicted in FIG. 5. The air supplied into the main ink container 31 flows through the path (for exhaust) 814, comes to the exhaust duct connection port 62, and is discharged by an exhaust discharging means which is not depicted. In this way, by letting the air suctioned from the gutter 25 flow through the interior of the main ink container 31 and come to the exhaust duct connection port 62, the solvent in the main ink container 31 is vaporized (volatilized).

Vaporizing the solvent in the main ink container 31 by letting the air suctioned from the gutter 25 flow through the interior of the main ink container 31 and come to the exhaust duct connection port 62 is continued until the liquid level sensor 31B no longer detects the ink 68A with descending of the liquid level of the ink 68A in the main ink container 31 and the ink 68A comes to an initial liquid level (at which detection of the liquid level of the ink 68A by the liquid level sensor 31B is turned from OFF to ON and vice versa) (S4043).

This can prevent that the amount of the ink 68A in the main ink container 31 increases too much beyond an acceptable level as a result of the following: ink collected in the main ink container 31 from the gutter 25 through the paths (for collection) 811 and 812 during printing by the print head 2; and the solvent 69A is supplied from the solvent container 33.

Continuation for five to ten minutes of the operation of suctioning air from the gutter 25 by actuating the pump (for collection) 35, once collecting the suctioned air in the main ink container 31, and discharging the air from the exhaust duct connection port 62 through the path (for exhaust) 814 results in an increase in the back pressure of the pump (for collection) 35 and a decrease in the suction capacity of the pump (for collection) 35.

During this operation, while actuating the pump 34 and the pump 35, by closing the solenoid valve 50 and opening the solenoid valve 49 and the solenoid valve 58 and thereby circulating the ink 68A in the main ink container 31 through the paths 801, 808, and 812 in turn for about one minute, the air suction capacity of the pump 35 from the gutter 25 will recover.

Once the liquid level of the ink 68A in the main ink container 31 has returned to the initial level (Yes at S4043), viscosity measurement is made of the ink 68A in the main ink container 31 subjected to solvent vaporization (S4044). To measure viscosity of the ink 68A, the control unit closes the solenoid valve (for collection) 50 and actuates the pump (for circulation) 36 with the solenoid valve (for viscosity measurement) 57 being open. In this state, through the path (for viscosity measurement) 824, by letting the ink 68A in the main ink container 31 flow through the filter (for viscosity measurement) 42 and then pass through the viscosity measuring instrument 45, viscosity is measured. The ink whose viscosity has been measured by the viscosity measuring instrument 45 flows through the solenoid valve (for viscosity measurement) 57 and is let to return to the interior of the main ink container 31 again through the path (for circulation via the head) 822.

Figure 6:
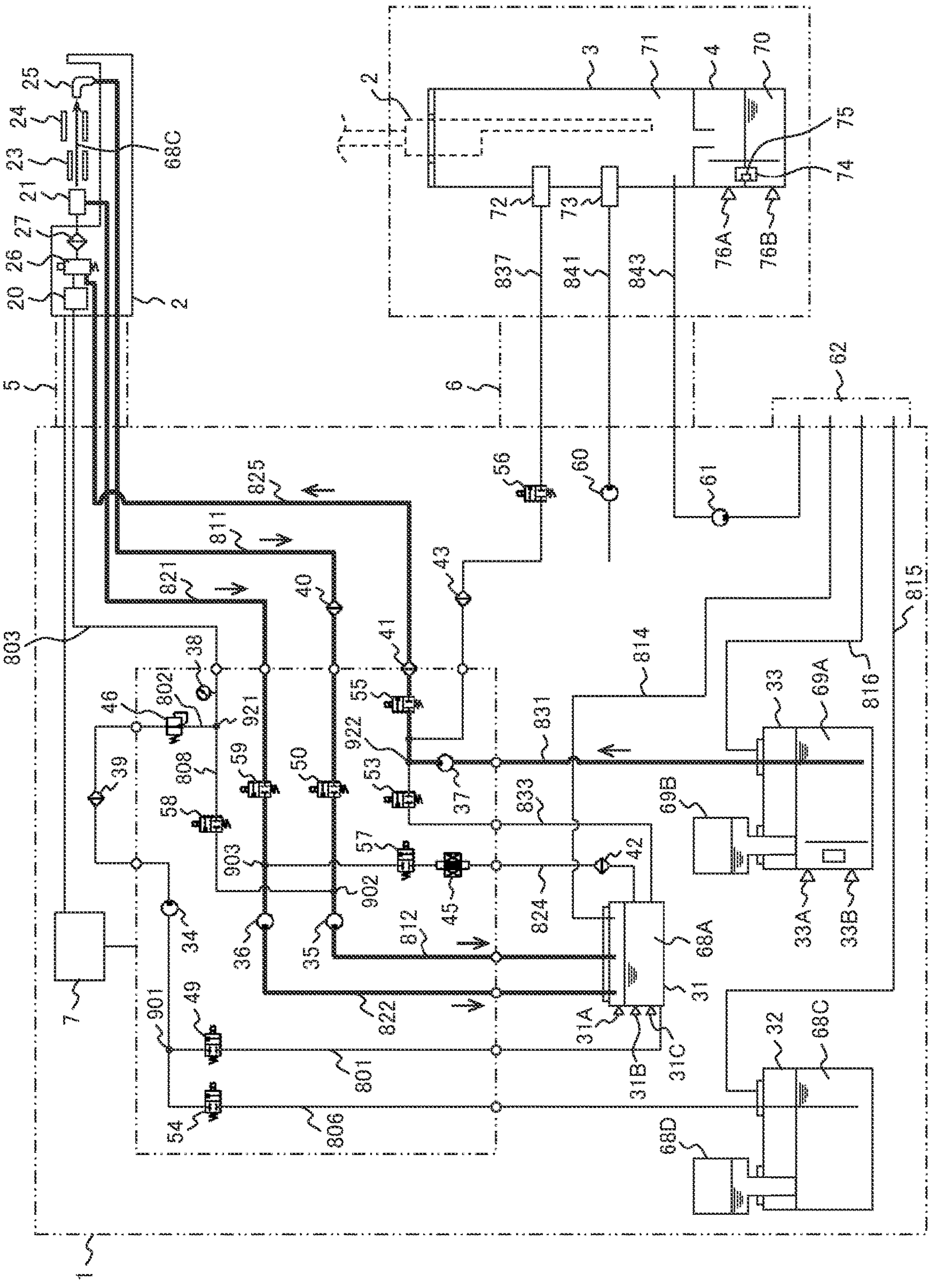
FIG. 6 is a path diagram depicting paths through which a solvent is supplied to the print head and collected in the processing for preventing ink sticking in the inkjet recording apparatus according to the embodiment disclosed herein.
Figure 7:
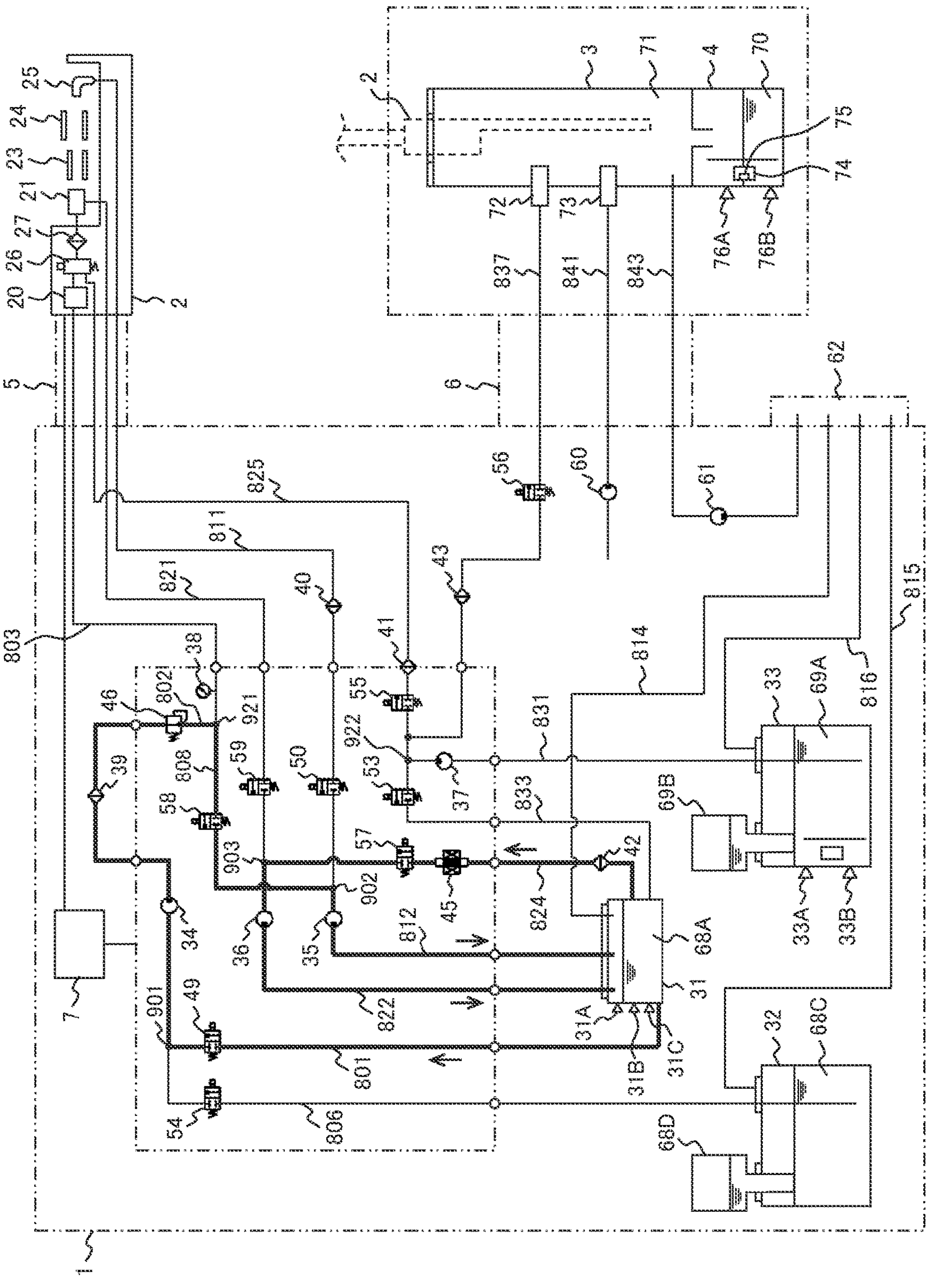
FIG. 7 is a path diagram depicting paths through which ink is circulated in the main body, when ink viscosity is measured, in the processing for preventing ink sticking in the inkjet recording apparatus according to the embodiment disclosed herein.

Once having measured the viscosity with the viscosity measuring instrument 45, the control unit closes the solenoid valve (for viscosity measurement) 57 to stop the supply of ink to the viscosity measuring instrument 45. Then, while actuating the pump (for circulation) 36, the control unit further actuates the pump (for solvent) 37 and the pump (for collection) 35 and opens the solenoid valve (for nozzle cleaning) 55, solenoid valve (for collection) 50, and solenoid valve (for circulation) 59, and carries out spouting out the solvent from the print head 2 (S4045). By opening the solenoid valves, 55, 50, and 59, as is depicted in FIG. 6, the following paths each become open: a solvent path, depicted by thick line, which is comprised of the path (for solvent supply) 831 and the path (for nozzle cleaning) 825 connecting the solvent container 33 and the solenoid valve (for switchover) 26 in the print head 2; a circulation path, depicted by thick line, which is comprised of the path (for circulation via the head) 821 and the path (for circulation via the head) 822 connecting the nozzle 21 of the print head 2 and the main ink container 31; and a collection path, depicted by thick line, which is comprised of the path (for collection) 811 and the path (for collection) 812 connecting the gutter 25 of the print head 2 and the main ink container 31.

In this state, the solvent 69A contained in the solvent container 33 is sucked up by the pump (for solvent) 37, flows through the solenoid valve (for nozzle cleaning) 55 and through the path (for solvent supply) 831 and the path (for nozzle cleaning) 825 constituting the solvent path, and is supplied to the nozzle 21 via the solenoid valve (for switchover) 26 and the filter 27.

A part of the solvent supplied to the nozzle 21 flows through the path (for circulation via the head) 821 constituting the circulation path connecting to the nozzle 21 and via the solenoid valve (for circulation) 59 and then is collected into the main ink container 31 through the path (for circulation via the head) 822. On the other hand, the solvent discharged forward from the nozzle 21 enters the gutter 25 and flows through the path (for collection) 811 constituting the collection path and via the solenoid valve (for collection) 50 and is collected into the main ink container 31 through the path (for collection) 812.

The apparatus is thus configured to supply the solvent 69A contained in the solvent container 33 to the print head 2 through the solvent path and collect the solvent to the main ink container 31 through the circulation path and the collection path; this enables it to pass the solvent through the insides of the solenoid valve (for collection) 50 and the solenoid valve (for circulation) 59 during inactivity of the inkjet recording apparatus 600A or 600B and to dissolve the ink remaining inside the solenoid valves 50 and 59 with the solvent and collect the ink solution. This can prevent sticking of ink remaining inside the solenoid valves 50 and 59 during inactivity of the inkjet recording apparatus 600A or 600B and prevent occurrence of malfunction of the solenoid valve 50 or 59 attributed to ink sticking.

Besides, even in a case where, as solvent is squirted from the nozzle 21, some of solvent beams deflects and swerves outside the gutter 25 and scatters around, the scattered solvent will evaporate without contaminating things around there unlike ink. Therefore, the operation for preventing ink sticking may also be performed in a state in which a space around the print head 2 is, for example, roughly covered with a beaker or the like; however, the print head 2 should be put in place in the head receptacle unit 3 as is in this embodiment disclosed herein and doing so allows the operation to be performed without preparing something like the beaker mentioned above.

Besides, unlike ink, because there is no need to worry about contaminating things around there even when solvent scatters around, it is possible to perform the step of spouting out the solvent in an unattended manner.

Then, the control unit circulates the ink 68A in the main ink container 31 to merge the collected solvent with the ink 68A uniformly inside the main ink container 31 into which the solvent was collected (S4046). As depicted by thick line in FIG. 7, ink circulation routes are as follows: a route passing through the path (for supply) 801 and the path (for circulation in the main body) 808 and leading to the path (for collection) 812 and a route passing through the path (for viscosity measurement) 824 and the path (for circulation via the head) 822.

By energizing the solenoid valve (for supply) 49 and the solenoid valve (for circulation in the main body) 58 to open one of the routes and actuating the pump (for supply) 34 and the pump (for collection) 35, the control unit lets the ink 68A contained in the main ink container 31 flow along the routes passing through the path (for supply) 801 and the path (for circulation in the main body) 808 and leading to the path (for collection) 812. This allows the ink 68A leaving the main ink container 31 to circulate via the solenoid valve (for supply) 49, pump (for supply) 34, filter (for supply) 39, pressure regulating valve 46, solenoid valve (for circulation in the main body) 58, and pump (for collection) 35 and return to the main ink container 31.

In the main body 1, also, by energizing the solenoid valve (for viscosity measurement) 57 to open the routes and actuating the pump (for circulation) 36, the control unit lets the ink 68A contained in the main ink container 31 flow along the path (for viscosity measurement) 824 and the path (for circulation via the head) 822 and flow via the viscosity measuring instrument 45, solenoid valve (for viscosity measurement) 57, and pump (for circulation) 36 and return to the main ink container 31, thus circulating the ink 68A. As noted above, measuring viscosity of the ink 68A with the viscosity measuring instrument 45 at timing when the ink is circulated in the main body 1 makes it easy to determine the condition of the ink 68A when the apparatus is used next time.

After ink circulation is performed for a predetermined period of time, the operation for preventing sticking enters a halt state (S4047) and the sticking prevention step (S404) is terminated.

Then, in a state when the apparatus remains in the halt state (S405) and the operating and display unit 8 displays a waiting state screen, the control unit checks whether the halt has been cancelled (S406); if the halt has been cancelled (Yes at S406), it terminates the processing flow for preventing sticking to be performed during inactivity of the apparatus depicted in FIG. 4.

Otherwise, if the halt state continues without being cancelled (No at S406), the control unit checks whether a certain period of time has elapsed after the halt state is entered at S4047 (S407); if a certain period of time does not elapse (No at S407), the processing returns to S405.

Otherwise, if a certain period of time (e.g., 24 or 48 hours) has elapsed after the halt state is entered at S4047 (Yes at S407), the processing returns to S404 and executes a series of operations from S4041 to S4047 repeatedly.

As described hereinbefore, a series of operations for preventing ink sticking explained with FIG. 4 is executed automatically at intervals of a certain period of time as long as the inactive state of printing operation using the print head 2 continues. This can prevent ink from sticking inside the solenoid valves within the main body 1 and inside the print head 2 even when the inactive state of printing operation continues long and enables it to start printing operation smoothly even if the print head 2 is actuated after being inactive for a comparatively long time.

<Adjusting Viscosity of Ink in the Main Ink Container>

Then, with FIGS. 8 through 16, descriptions are provided about adjusting viscosity of the ink in the main ink container to be performed in a state when the print head 2 is put in place in the head receptacle unit 3.

When printing is performed with the print head 2 for a long time, ink collected via the gutter 25 accumulates in the main ink container 31 and viscosity of the ink 68A in the main ink container 31 changes. Besides, solvent is let to spout out from the print head 2 and collected into the main ink container 31 at S4045 in the flowchart described with FIG. 4 and ink 68C in the auxiliary ink container 32 is resupplied to the main ink container 31; in consequence, viscosity of the ink 68A contained in the main ink container 31 changes and may fall outside an appropriate range. Moreover, when the print head remains unused for a long time, viscosity of the ink 68A in the main ink container 31 also changes, as solvent volatilizes in the meantime. Therefore, in a case where measurements of viscosity of the ink 68A contained in the main ink container 31 indicate that viscosity of the ink 68A has fallen outside an appropriate range, adjustment is required to make the viscosity of the ink 68A fall within the appropriate range.

Figure 8:
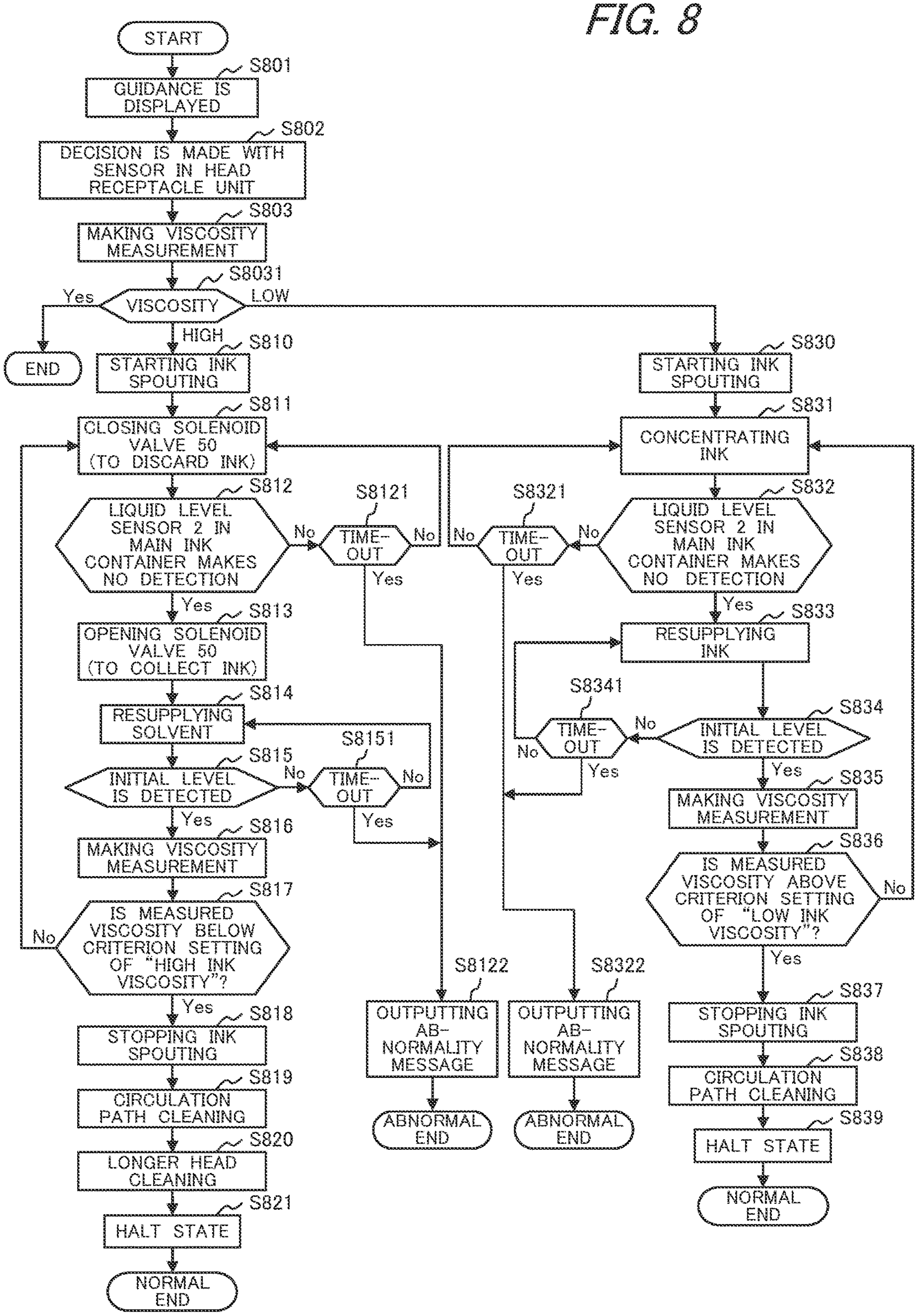
FIG. 8 is a flowchart depicting a processing flow for adjusting ink viscosity to make it fall within a certain range in the inkjet recording apparatus according to the embodiment disclosed herein.

A processing flow in which adjustment is made of viscosity of the ink 68A contained in the main ink container 31 is depicted in FIG. 8. First, a guidance on viscosity adjustment (omitted from depiction) is displayed on the operating and display unit 8 (S801).

Then, a decision is made that liquid contained in the collection container 4 attached to the head receptacle unit 3 is not more than a predetermined quantity using output of the magnetic sensor 76A and the magnet 75 (S802). If the amount of liquid in the collection container 4 is more than the predetermined quantity, the liquid in the collection container 4 is discarded and then the decision is made again.

Figure 9:
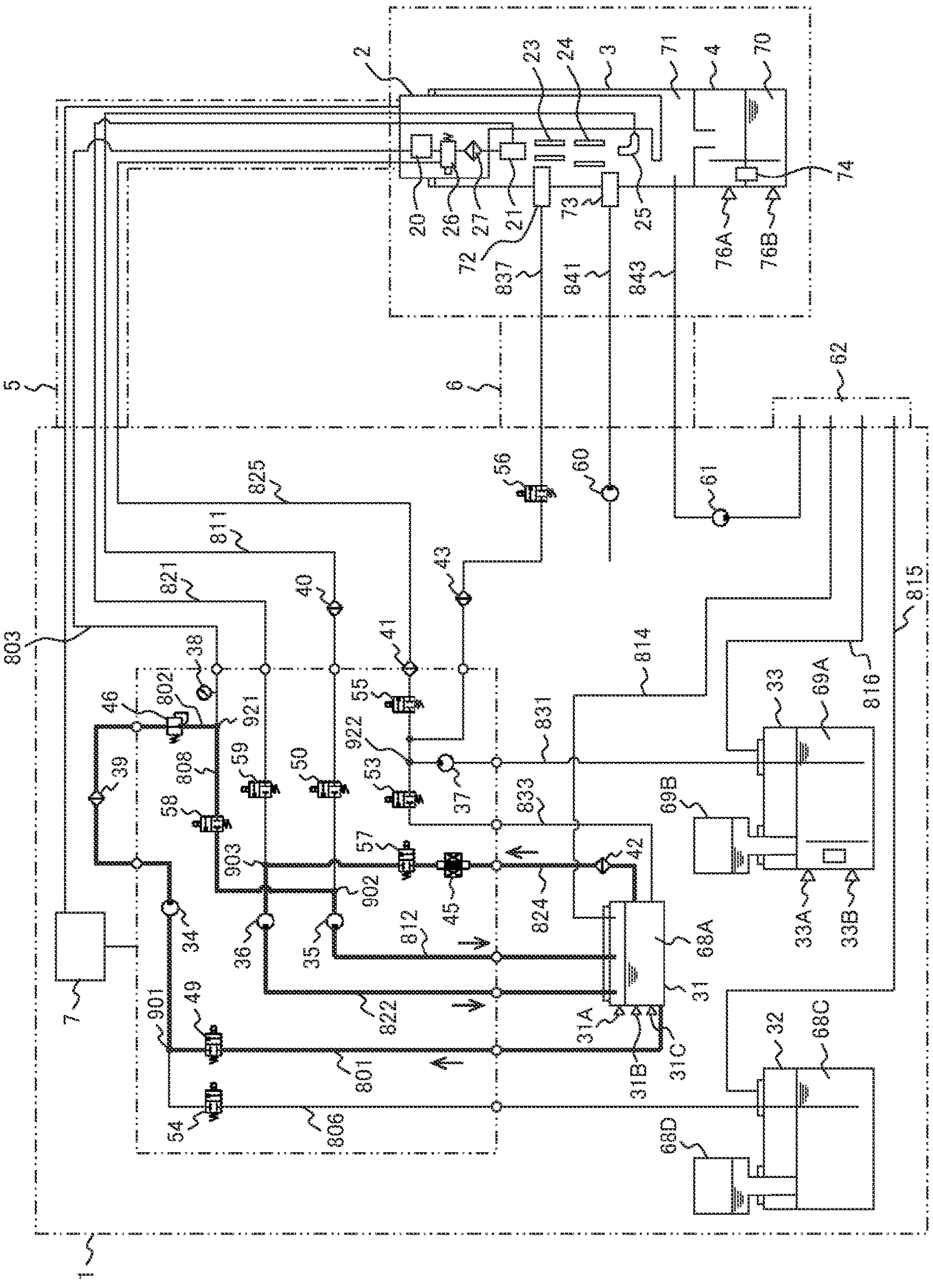
FIG. 9 is a path diagram depicting a path configuration in a state when ink viscosity is measured in the inkjet recording apparatus according to the embodiment disclosed herein.

After making sure that liquid contained in the collection container 4 is not more than the predetermined quantity, the control unit actuates the pump (for supply) 34 and the pump (for collection) 35 and opens the solenoid valve (for supply) 49 and the solenoid valve (for circulation in the main body) 58 to link up the path (for supply) 801, the path (for circulation in the main body) 808, and the path (for collection) 812, so that the ink 68A in the main ink container 31 will be circulated, as is depicted in FIG. 9. Besides, the control unit actuates the pump (for circulation) 36 and opens the solenoid valve (for viscosity measurement) 57 to link up the path (for viscosity measurement) 824 and the path (for circulation via the head) 822, so that the ink 68A contained in the main ink container 31 will flow via the viscosity measuring instrument 45, and viscosity of the ink 68A is measured (S803).

Measuring viscosity of the ink 68A here is performed in the same procedure as described for the step S4044 in the processing flowchart in FIG. 4.

A result of the viscosity measurement made at S803 is judged (S8031); if the judgment is that viscosity of the ink 68A falls within an appropriate range (Yes at S8031), the steps for adjusting ink viscosity are terminated.

In contrast, if the judgment at S8031 is that viscosity of the ink 68A is higher than the appropriate range ("high" at S8031), the processing goes to step S810. Otherwise, if the judgment is that viscosity of the ink 68A is lower than the appropriate range ("low" at S8031), the processing goes to step S830.

<<Adjustment in a Case that Ink Viscosity is High>>

If the judgment at S8031 in FIG. 8 is that viscosity of the ink 68A contained in the main ink container 31 is higher than the appropriate range, step S810 and subsequent steps are executed and adjustment is made to make the ink viscosity fall within the appropriate value range.

Figure 10:
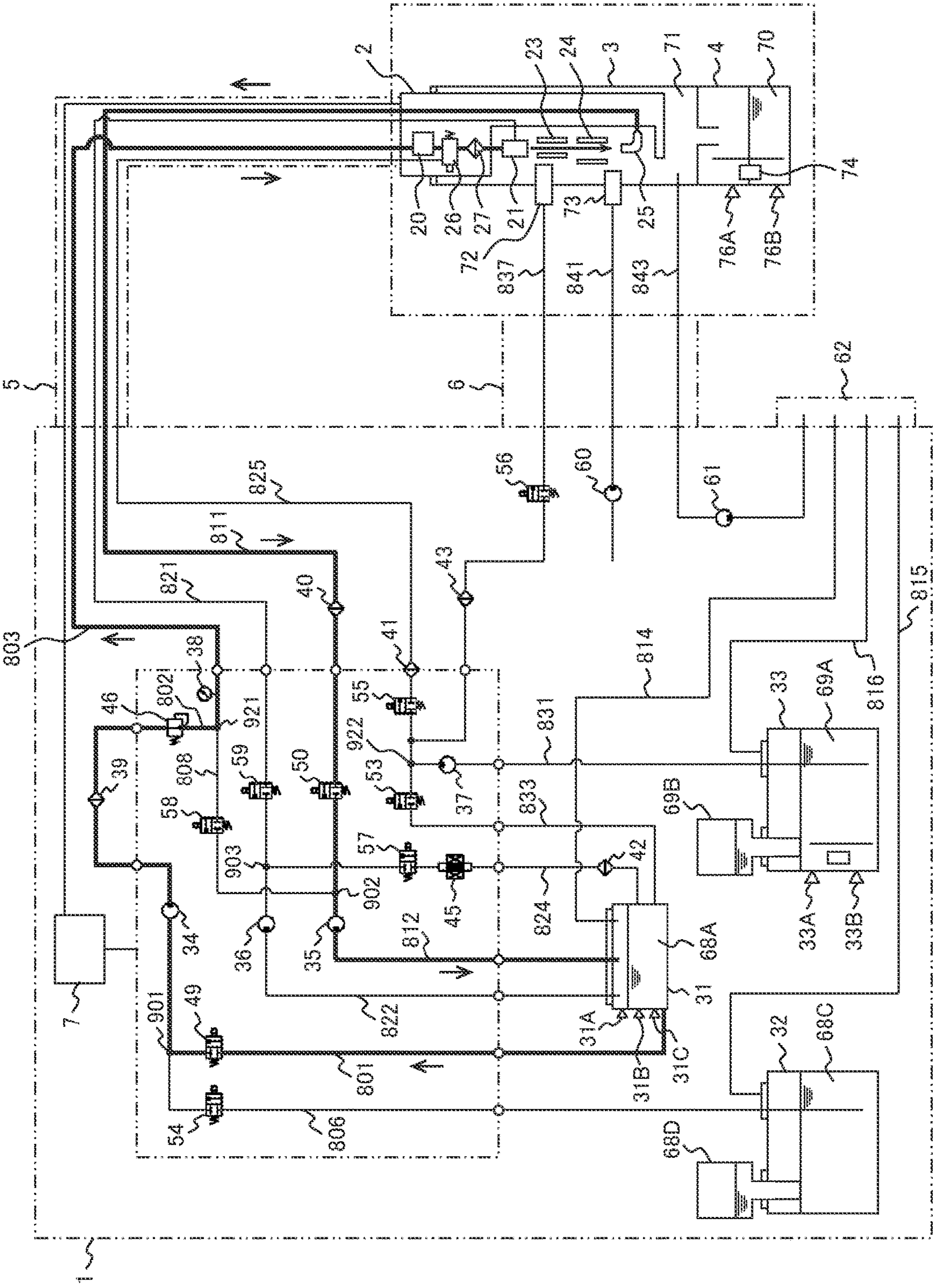
FIG. 10 is a path diagram depicting a path configuration in a state when ink is circulated via the print head in the processing for adjusting ink viscosity to make it fall within a certain range in an event of high ink viscosity in the inkjet recording apparatus according to the embodiment disclosed herein.

First, at step S810, a state in FIG. 9 is changed to a state in FIG. 10 to start ink spouting via the print head 2. Specifically, the control unit closes the solenoid valve (for viscosity measurement) 57 to deactivate the pump (for circulation) 36, so that the ink 68A will not flow via the viscosity measuring instrument 45.

The control unit also closes the solenoid valve 58, so that the ink 68A in the main ink container 31 will not circulate. Then, while the pump (for supply) 34 and the pump (for collection) 35 are actuated, the control unit opens the solenoid valve (for switchover) 26 and links up the paths (for supply) 801, 802, and 803, so that the ink 68A will be supplied from the main ink container 31 to the print head 2, thus starting ink spouting from the nozzle 21 (S810). At the same time, the control unit opens the solenoid valve (for collection) 50 to open the ink collection path comprised of the path (for collection) 811 and the path (for collection) 812, so that the ink 68A supplied to the print head 2 and spouted out from the nozzle 21 will be caught by the gutter 25 and collected into the main ink container 31.

Figure 11:
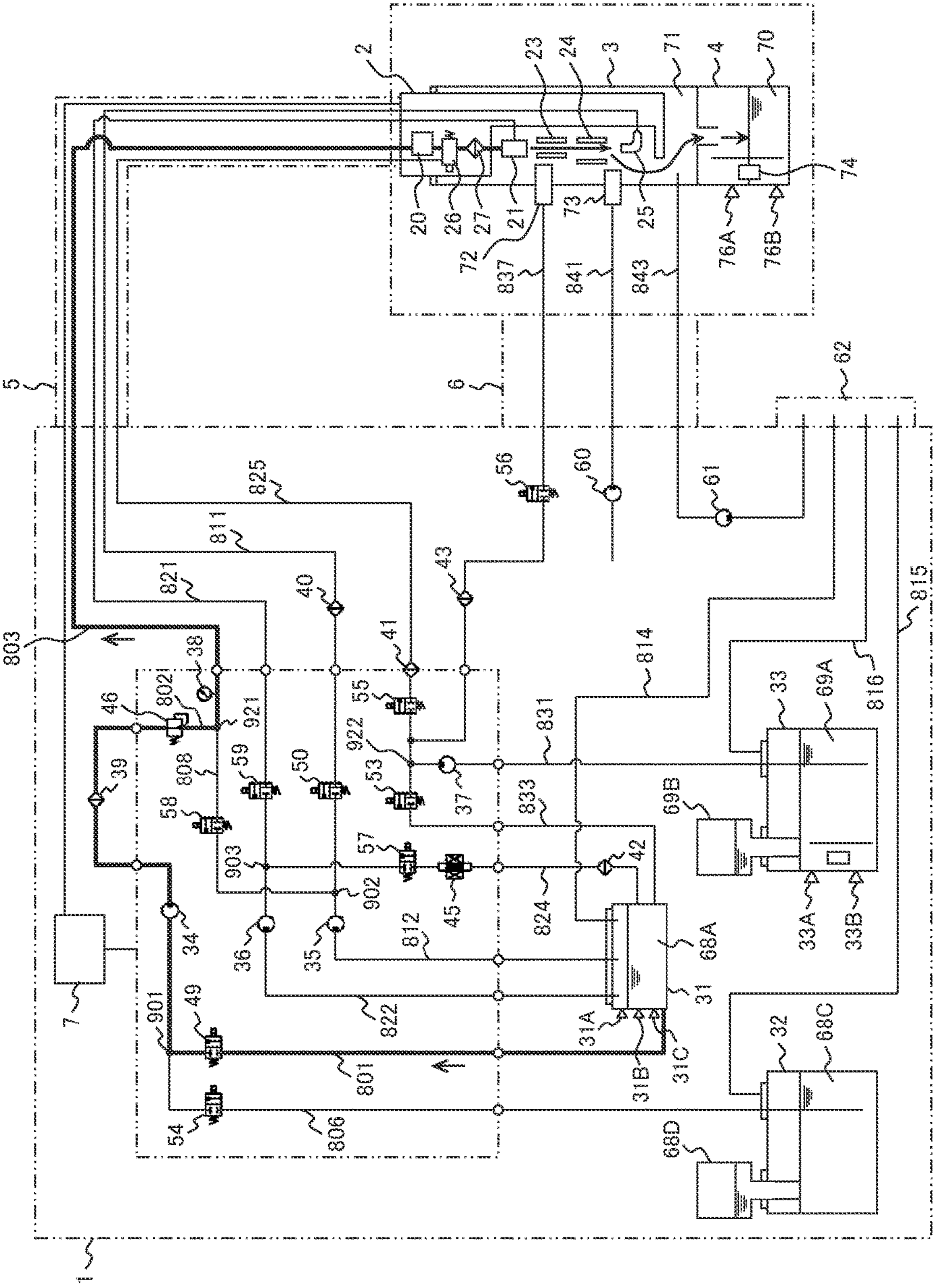
FIG. 11 is a path diagram depicting a path configuration in a state when ink is discharged from the print head in the processing for adjusting ink viscosity to make it fall within a certain range in an event of high ink viscosity in the inkjet recording apparatus according to the embodiment disclosed herein.

Then, the control unit closes the solenoid valve 50 (S811) to block the ink collection path formed of the path 811 (for collection) and the path 812 (for collection), as is depicted in FIG. 11. Consequently, the ink 68A supplied to the print head 2 and spouted out from the nozzle 21 will overflow from the gutter 25 and will be collected into the collection container 4 attached to the head receptacle unit 3. Consequently, the liquid level of the ink 68A contained in the main ink container 31 will continue to fall.

As the liquid level of the ink 68A contained in the main ink container 31 continues to fall, a detection signal of the ink 68A output by the liquid level sensor 31B (sensor 2) installed in the main ink container 31 is turned OFF (making no detection) (Yes at S812). This state sustains until a predetermined period of time has elapsed after the detection signal by the liquid level sensor 31B (sensor 2) is turned OFF (making no detection). Consequently, the liquid level of the ink 68A contained in the main ink container 31 becomes lower than the liquid level that is detected by the liquid level sensor 31B (sensor 2).

The above-mentioned predetermined period of time after the detection signal of the ink 68A by the liquid level sensor 31B (sensor 2) is turned OFF (making no detection) (Yes at S812) is determined using a conditional expression preset in the MPU 301 depending on the viscosity of the ink measured at S803 and temperature of the ink measured with a temperature sensor which is not depicted. If the detected ink viscosity falls outside the appropriate range to a large extent, the predetermined period of time is set longer; if the detected ink viscosity falls outside the appropriate range to a comparatively small extent, the predetermined period of time is set shorter.

A quantity of ink 68A to be discarded from the main ink container 31 is thus adjusted depending on the ink viscosity; this eliminates the need to discard all the ink 68A in the main ink container 31 and replace it with new ink even when the ink viscosity is higher than an appropriate range, so that ink can be used effectively with a reduction of the quantity of discarded ink.

Otherwise, while ink continues to overflow from the gutter 25, if a detection signal of the ink 68A output by the liquid level sensor 31B (sensor 2) installed in the main ink container 31 is not turned OFF (making no detection) even when a certain period of time has elapsed (No at S812 remains unchanged, whereas a preset time is out; Yes at S8121), the control unit outputs an abnormality message on the operating and display unit 8 (S8122) and closes the solenoid valve 49 to stop the supply of ink to the print head 2.

Figure 12:
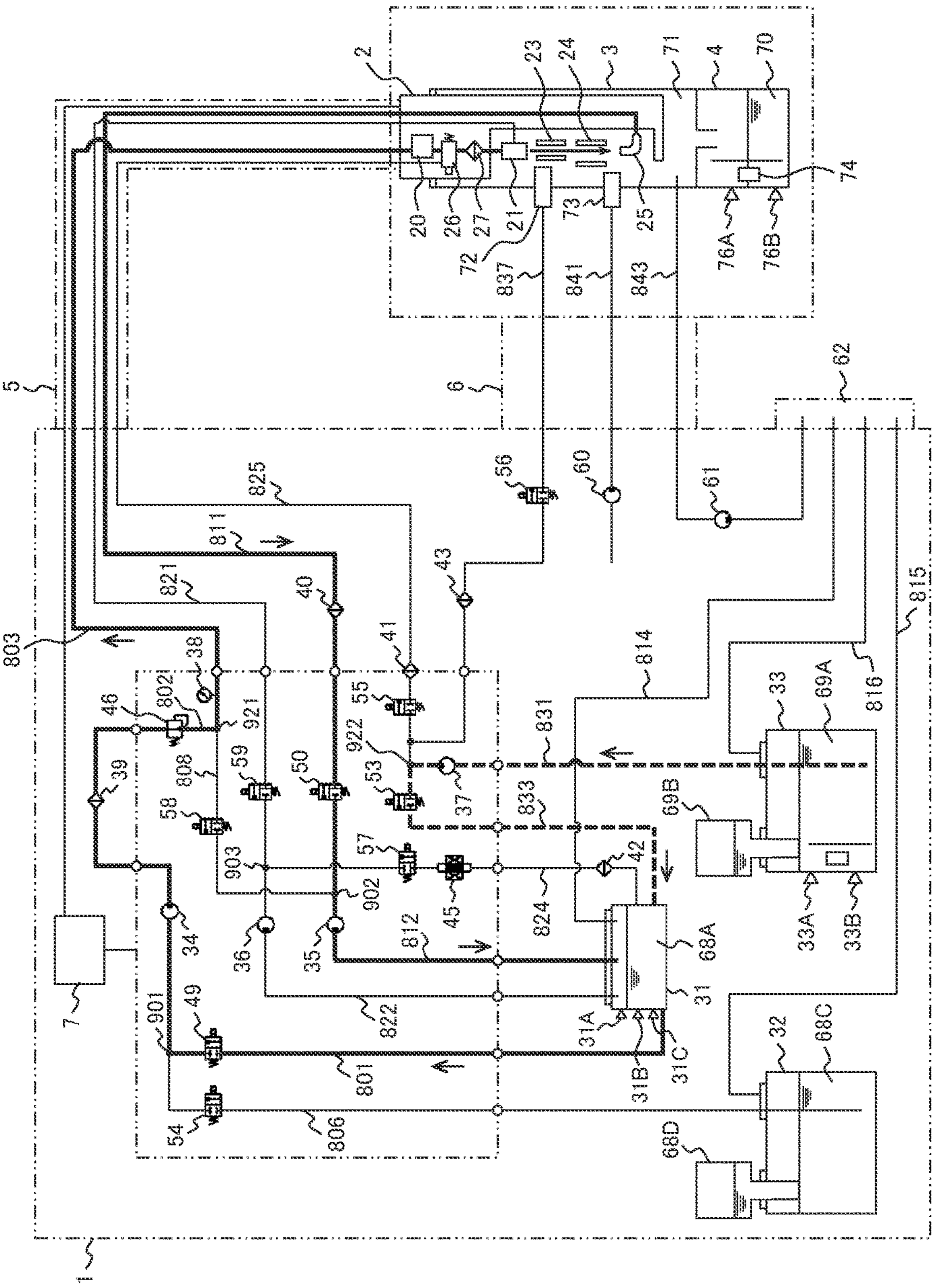
FIG. 12 is a path diagram depicting a path configuration in a state when a solvent is supplied to the main ink container, while ink is circulated, in the processing for adjusting ink viscosity to make it fall within a certain range in an event of high ink viscosity in the inkjet recording apparatus according to the embodiment disclosed herein.

Upon the elapse of a predetermined period of time after the detection signal of the ink 68A by the liquid level sensor 31B (sensor 2) is turned OFF (making no detection) (Yes at S812), the control unit opens the solenoid valve 50 to open the ink collection path comprised of the path (for collection) 811 and the path (for collection) 812 (S813), so that ink spouted out from the nozzle 21 of the print head 2 and caught by the gutter 25 will be collected into the main ink container 31, as is depicted in FIG. 12.

In this state, the control unit opens the solenoid valve (for resupply of solvent) 53 to link up the path (for solvent supply) 831 and the path (for resupply of solvent) 833 leading to the main ink container 31 from the solvent container 33, as is indicated by a thick dotted line in FIG. 12, and, in this condition, actuates the pump (for solvent) 37. Consequently, the solvent 69A contained in the solvent container 33 is resupplied into the main ink container 31 through the paths 831 and 833 (S814). This resupply of the solvent 69A into the main ink container 31 is continued until the liquid level sensor 31B (sensor 2) detects that the liquid level of the ink 68A contained in the main ink container 31 has reached its initial level (until Yes is made at S815).

Figure 13:
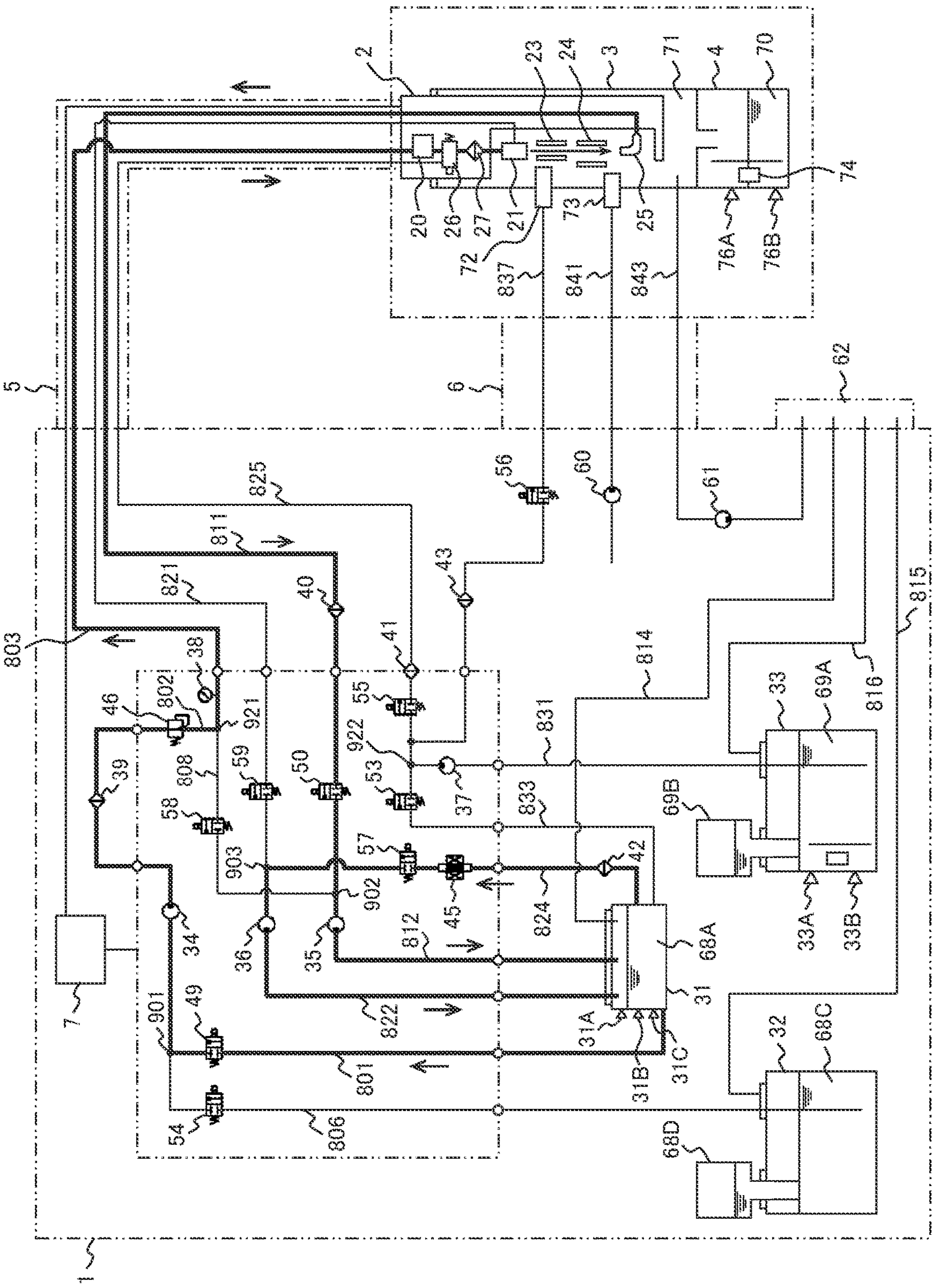
FIG. 13 is a path diagram depicting a path configuration in a state when viscosity of ink in the main ink container is measured, while ink is circulated, in the processing for adjusting ink viscosity to make it fall within a certain range in an event of high ink viscosity in the inkjet recording apparatus according to the embodiment disclosed herein.

Once the liquid level sensor 31B (sensor 2) has detected that the liquid level of the ink 68A contained in the main ink container 31 has reached its initial level (Yes at S815), the control unit closes the solenoid valve (for resupply of solvent) 53 to stop supply of the solvent 69A from the solvent container 33 to the main ink container 31. As is depicted in FIG. 13, the control unit actuates the pump (for circulation) 36 and opens the solenoid valve (for viscosity measurement) 57 to link up the path (for viscosity measurement) 824 and the path (for circulation via the head) 822, so that the ink 68A contained in the main ink container 31 will flow via the viscosity measuring instrument 45, and viscosity of the ink 68A is measured (S816).

Unlike the step S803 and the step S4044 in the processing flowchart in FIG. 4, a way of measuring viscosity of the ink 68A here is performed, while circulating the ink 68A by supplying the ink 68A from the main ink container 31 to the print head 2, catching the ink by the gutter 25, and collecting it to the main ink container 31 through the paths (for collection) 811 and 812.

Otherwise, if the liquid level sensor 31B (sensor 2) does not detect that the liquid level of the ink 68A contained in the main ink container 31 has reached its initial level even when a certain period of time has elapsed after the start of resupplying the solvent 69A into the main ink container 31 (No at S815 remains unchanged, whereas a preset time is out; Yes at S8151), the control unit outputs an abnormality message on the operating and display unit 8 (S8122) and closes the solenoid valve (for resupply of solvent) 53 to stop the resupply of the solvent 69A into the main ink container 31.

Then, a value of viscosity measured at S816 is judged (S817) and, if the measured value of viscosity is higher than a criterion setting of “high ink viscosity” prestored in the ROM 306 (No at S817), the processing returns to S811 and repeats a series of the steps for decreasing ink viscosity.

Otherwise, if the value of measured viscosity is below or at the criterion setting of “high ink viscosity” prestored in the ROM 306 (Yes at S817), the control unit decides that ink viscosity has fallen within an appropriate range. As instructed by the CPU 301, by closing the solenoid valve (for supply) 49 and deactivating the pump (for supply) 34 in FIG. 13, the control unit stops the supply of the ink 68A to the print head 2 and stops ink spouting from the nozzle 21 of the print head 2 (S818) and, besides, closes the solenoid valve (for viscosity measurement) 57 to stop the supply of ink to the viscosity measuring instrument 45.

Figure 14:
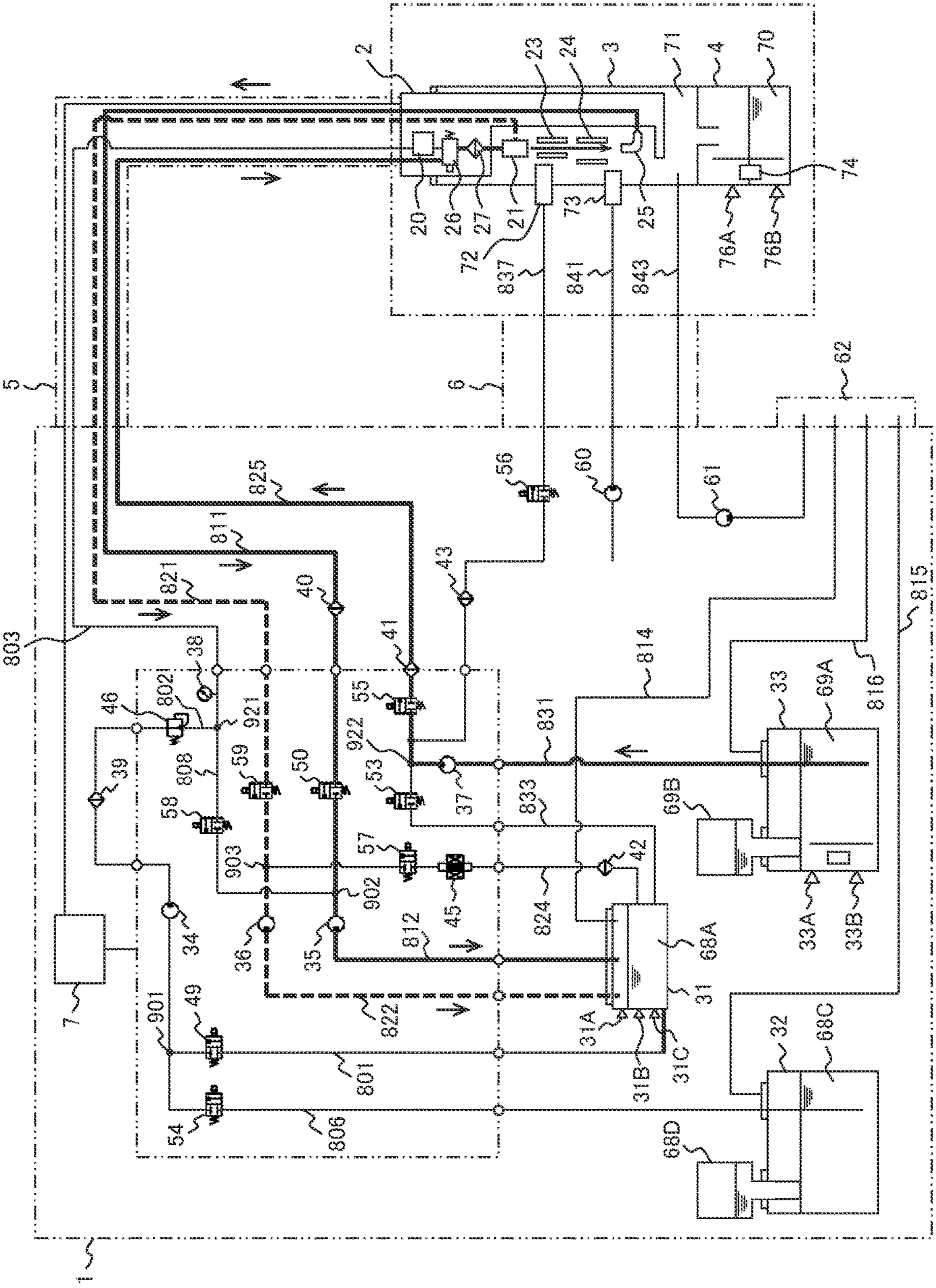
FIG. 14 is a path diagram depicting a path configuration in a state when the circulation path including the print head is cleaned in the inkjet recording apparatus according to the embodiment disclosed herein.

Then, as is depicted in FIG. 14, by opening the solenoid valve (for nozzle cleaning) 55 and actuating the pump (for solvent) 37, the control unit supplies the solvent 69A from the solvent container 33 to the nozzle 21 of the print head 2 through the solvent path which is routed through the path (for solvent supply) 831 and the path (for nozzle cleaning) 825 and leads to the print head 2. At the same time, the control unit opens the solenoid valve (for collection) 50 and the solenoid valve (for circulation) 59 to make the path (for circulation via the head) 821 and the path (for collection) 811 passable from the print head 2 to the main ink container 31, so that the solvent 69A supplied to the print head 2 will be collected to the main ink container 31 through the path (for circulation via the head) 821 and the path (for collection) 811. Consequently, ink 68A remaining in the path (for circulation via the head) 821, the path (for collection) 811, the nozzle 21, and the gutter 25 is washed away and circulation path cleaning is performed (S819).

Figure 15:
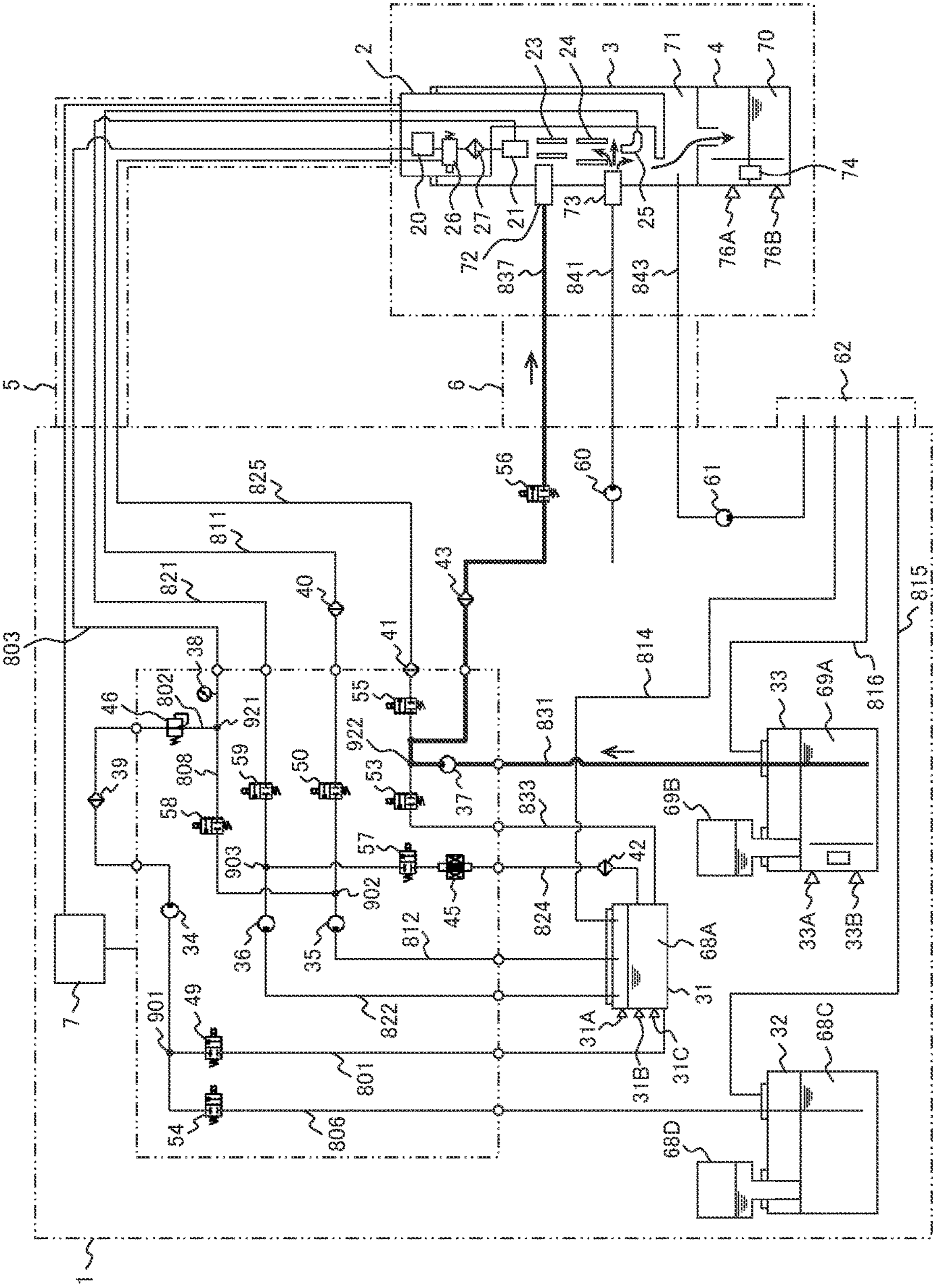
FIG. 15 is a path diagram depicting a path configuration in a state when the print head is cleaned longer in the inkjet recording apparatus according to the embodiment disclosed herein.

After cleaning the circulation path for a predetermined period of time at S819, the control unit closes the solenoid valve (for collection) 50, solenoid valve (for nozzle cleaning) 55, and solenoid valve (for circulation) 59 and deactivates the pump (for collection) 35 and the pump (for circulation) 36. As is depicted in FIG. 15, while actuating the pump (for solvent) 37, the control unit opens the solenoid valve (for head cleaning) 56, so that the solvent will be spouted out from the cleaning nozzle 72 into the head receptacle unit 3 with the print head 2 being put in place and sprayed onto the print head 2 from outside. In this way, the print head 2 is cleaned for a longer time than usual cleaning using an increased amount of the solvent 69A, i.e., longer head cleaning (S820) is performed. This can remove contamination onto the print head 2 by ink when ink overflowed from the gutter 25 at S811.

Following stop of solvent spouting, the control unit actuates the pump (for drying) 60 to blow air toward the print head 2 from a supply nozzle 73 having an air outlet and actuates the pump (for suction) 61 to remove air inside the head receptacle unit 3, so that the print head 2 getting wet with the solvent 69A will be let to dry; then, the step of longer head cleaning is terminated.

Figure 17:
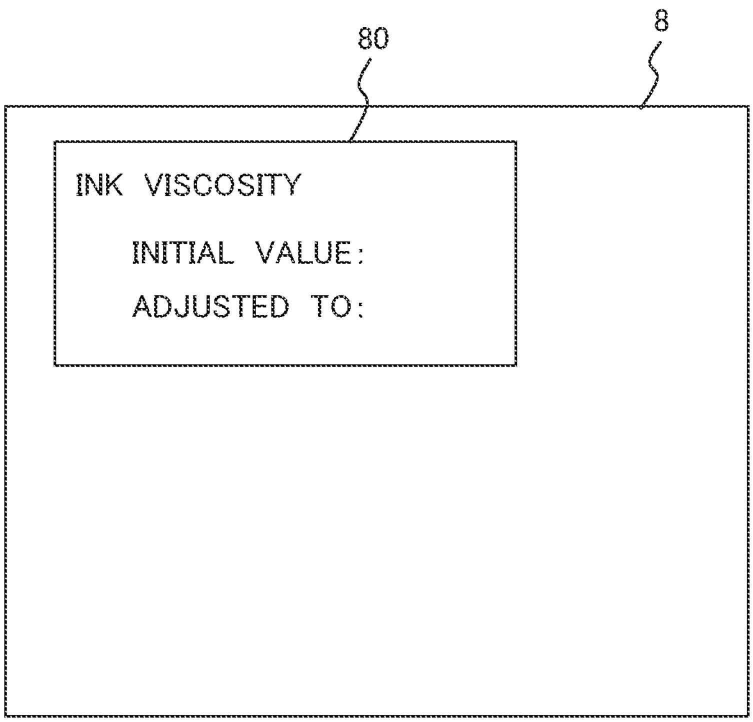
FIG. 17 is a front view of the operating and display unit that presents an ink viscosity display field to display an initial value of ink viscosity and a value to which viscosity was adjusted, according to the embodiment disclosed herein.

After longer head cleaning is performed, the control unit makes the apparatus enter in a halt state (S821), terminates a series of the steps for normalizing ink viscosity, and displays an initial value of ink viscosity (measured at S803) and a value to which viscosity was adjusted (measured at S816) in an ink viscosity display field 80 provided on the operating and display unit 8, as is depicted in FIG. 17. However, as information that is presented in the ink viscosity display field 80, instead of values themselves of ink viscosity, information on ink viscosity may be displayed (e.g., "ink viscosity is high and has to be adjusted", "viscosity falls within an appropriate range", etc.). Also, additional information on date and time when viscosity adjustment was performed and, furthermore, information on date and time when previous viscosity adjustment was performed may also be displayed in an ink viscosity display field 80 provided on the operating and display unit 8, though not illustrated in FIG. 17. Note that the step S820, longer head cleaning may be skipped.

<<Adjustment in a Case that Ink Viscosity is Low>>

If the judgment at S8031 in FIG. 8 is that viscosity of the ink 68A contained in the main ink container 31 is lower than the appropriate range, step S830 and subsequent steps are executed and adjustment is made to make the low ink viscosity fall within the appropriate value range.

First, at step S830, the state in FIG. 9 is changed to the state in FIG. 10 to start ink spouting via the print head 2. Specifically, the control unit closes the solenoid valve (for viscosity measurement) 57 to deactivate the pump (for circulation) 36, so that the ink 68A will not flow via the viscosity measuring instrument 45.

The control unit also closes the solenoid valve 58, so that the ink 68A in the main ink container 31 will not circulate.

Then, while the pump (for supply) 34 and the pump (for collection) 35 are actuated, the control unit opens the solenoid valve (for switchover) 26 and links up the paths (for supply) 801, 802, and 803, so that the ink 68A will be supplied from the main ink container 31 to the print head 2, thus starting ink spouting from the nozzle 21. At the same time, the control unit opens the solenoid valve (for collection) 50 to open the ink collection path comprised of the path (for collection) 811 and the path (for collection) 812, so that the ink 68A supplied to the print head 2 and spouted out from the nozzle 21 will be caught by the gutter 25 and collected into the main ink container 31.

By continuing the state depicted in FIG. 10 in which the ink 68A is supplied from the main ink container 31 to the print head 2 and spouted out from the nozzle 21, then caught by the gutter 25 and collected into the main ink container 31 through the ink collection path, solvent included in the ink 68A is volatilized and the ink is concentrated (S831).

In comparison to the amount of ink 68A supplied from the main ink container 31 to the print head 2, the amount of ink 68A collected into the main ink container 31 through the ink collection path after being caught by the gutter 25 decreases as much as a quantity of volatilized solvent and the liquid level of the ink 68A contained in the main ink container 31 continues to fall.

As the liquid level of the ink 68A contained in the main ink container 31 continues to fall, a detection signal of the ink 68A output by the liquid level sensor 31B (sensor 2) installed in the main ink container 31 is turned OFF (making no detection) (Yes at S832). This state sustains until a predetermined period of time has elapsed after the detection signal by the liquid level sensor 31B (sensor 2) is turned OFF (making no detection). Consequently, the liquid level of the ink 68A contained in the main ink container 31 becomes lower than the liquid level that is detected by the liquid level sensor 31B (sensor 2).

The above-mentioned predetermined period of time after the detection signal of the ink 68A by the liquid level sensor 31B (sensor 2) is turned OFF (making no detection) (Yes at S832) is determined using a conditional expression preset in the MPU 301 depending on the viscosity of the ink measured at S803 and temperature of the ink measured with a temperature sensor which is not depicted. If the detected ink viscosity falls outside the appropriate range to a large extent, the predetermined period of time is set longer; if the detected ink viscosity falls outside the appropriate range to a comparatively small extent, the predetermined period of time is set shorter.

A quantity of solvent to be vaporized from the ink 68A is thus adjusted depending on the ink viscosity; this eliminates the need to discard all the ink 68A in the main ink container 31 and replace it with new ink even when the ink viscosity is lower than an appropriate range, so that ink can be used effectively with a reduction of the quantity of discarded ink.

Otherwise, even upon the elapse of a certain period of time, while the ink 68A is supplied from the main ink container 31 to the print head 2, spouted out from the nozzle 21, caught by the gutter 25, and collected into the main ink container 31 through the ink collection path, if a detection signal of the ink 68A output by the liquid level sensor 31B (sensor 2) installed in the main ink container 31 is not turned OFF (making no detection) (No at S832 remains unchanged, whereas a preset time is out; Yes at S8321), the control unit outputs an abnormality message on the operating and display unit 8 (S8322) and closes the solenoid valve 49 to stop ink supply to the print head 2.

Figure 16:
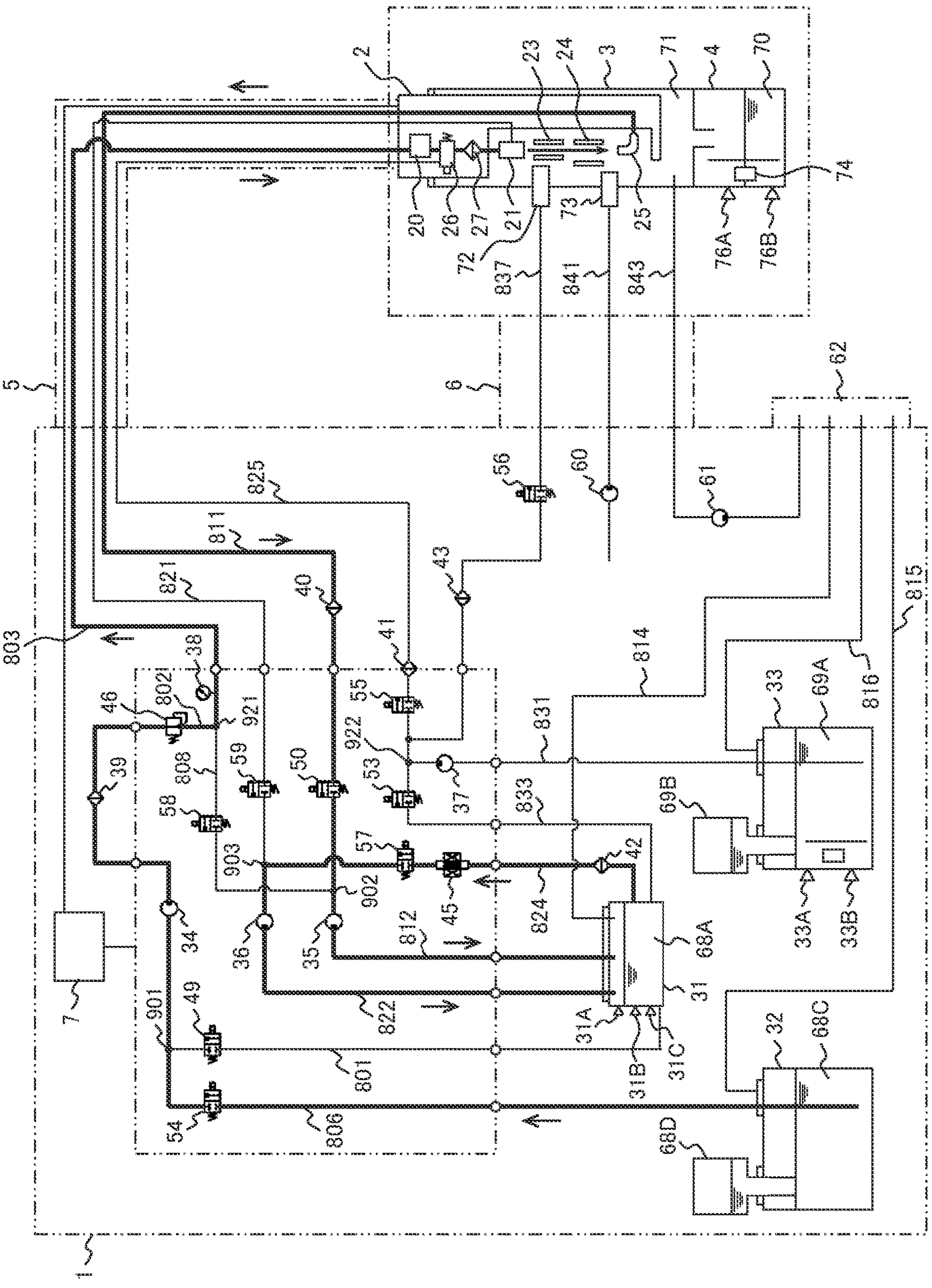
FIG. 16 is a path diagram depicting a path configuration in a state when viscosity of ink in the main ink container is measured, while ink is resupplied from an auxiliary ink container to the main ink container via the print head, in the processing for adjusting ink viscosity to make it fall within a certain range in an event of low ink viscosity in the inkjet recording apparatus according to the embodiment disclosed herein.

Upon the elapse of a predetermined period of time after the detection signal of the ink 68A by the liquid level sensor 31B (sensor 2) is turned OFF (making no detection) (Yes at S832), the control unit closes the solenoid valve (for supply) 49 and opens the solenoid valve (for resupply of ink) 54, as is depicted in FIG. 16. Consequently, supply of the ink 68A from the main ink container 31 to the print head 2 is stopped and the ink 68C contained in the auxiliary ink container 32 is supplied through a route comprised of the path (for resupply) 806 and the paths (for supply) 802 and 803 to the print head 2 and is spouted out from the nozzle 21. This ink 68C spouted out from the nozzle 21 is caught by the gutter 25 and is collected into the main ink container 31 through the ink collection path. The ink 68C contained in the auxiliary ink container 32 is thus resupplied to the main ink container 31 (S833).

This resupply of the ink 68C from the auxiliary ink container 32 to the main ink container 31 is continued when the liquid level sensor 31B (sensor 2) detects that the liquid level of the ink 68A contained in the main ink container 31 has reached its initial level (until Yes is made at S834).

Once the liquid level sensor 31B (sensor 2) has detected that the liquid level of the ink 68A contained in the main ink container 31 has reached its initial level (Yes at S834), the control unit actuates the pump (for circulation) 36 and opens the solenoid valve (for viscosity measurement) 57 to link up the path (for viscosity measurement) 824 and the path (for circulation via the head) 822, as is depicted in FIG. 16, so that the ink 68A contained in the main ink container 31 will flow via the viscosity measuring instrument 45, and viscosity of the ink 68A is measured (S835).

Unlike the step S803 and the step S4044 in the processing flowchart in FIG. 4, a way of measuring viscosity of the ink 68A here is performed, while supplying the ink 68C from the auxiliary ink container 32 to the main ink container 31, by supplying the ink 68C from the auxiliary ink container 32 to the print head 2, catching the ink by the gutter 25, and collecting it to the main ink container 31 through the paths (for collection) 811 and 812.

Otherwise, if the liquid level sensor 31B (sensor 2) does not detect that the liquid level of the ink 68A contained in the main ink container 31 has reached its initial level even when a certain period of time has elapsed after the start of supplying the ink 68C into the main ink container 31 (No at S834 remains unchanged, whereas a preset time is out; Yes at S8341), the control unit outputs an abnormality message on the operating and display unit 8 (S8322) and closes the solenoid valve (for resupply of ink) 54 to stop the resupply of the ink 68C from the auxiliary ink container 32 to the main ink container 31.

Then, a value of viscosity measured at S835 is judged (S836) and, if the measured value of viscosity is lower than a criterion setting of "low ink viscosity" prestored in the ROM 306 (No at S836), the processing returns to S831 and repeats a series of the steps for increasing ink viscosity.

Otherwise, if the value of measured viscosity is above or at the criterion setting of "low ink viscosity" prestored in the ROM 306 (Yes at S836), the control unit decides that ink viscosity has fallen within an appropriate range. As instructed by the CPU 301, by closing the solenoid valve (for resupply of ink) 54 and deactivating the pump (for supply) 34 in FIG. 16, the control unit stops the supply of the ink 68C to the print head 2 and stops ink spouting from the nozzle 21 of the print head 2 (S837) and, besides, closes the solenoid valve (for viscosity measurement) 57 to stop the supply of ink to the viscosity measuring instrument 45.

Then, as is depicted in FIG. 14, by opening the solenoid valve (for nozzle cleaning) 55 and actuating the pump (for solvent) 37, the control unit supplies the solvent 69A from the solvent container 33 to the nozzle 21 of the print head 2 through the solvent path which is routed through the path (for solvent supply) 831 and the path (for nozzle cleaning) 825 and leads to the print head 2. At the same time, the control unit opens the solenoid valve (for collection) 50 and the solenoid valve (for circulation) 59 to make the path (for circulation via the head) 821 and the path (for collection) 811 passable from the print head 2 to the main ink container 31, so that the solvent 69A supplied to the print head 2 will be collected to the main ink container 31 through the path (for circulation via the head) 821 and the path (for collection) 811. Consequently, ink 68A remaining in the path (for circulation via the head) 821, the path (for collection) 811, the nozzle 21, and the gutter 25 is washed away and circulation path cleaning is performed (S838).

After circulation path cleaning is performed, the control unit makes the apparatus enter in a halt state (S839), terminates a series of the steps for normalizing ink viscosity, and displays an initial value of ink viscosity (measured at S803) and a value to which viscosity was adjusted (measured at S835) in the ink viscosity display field 80 provided on the operating and display unit 8, as is depicted in FIG. 17. However, as information that is presented in the ink viscosity display field 80, instead of values themselves of ink viscosity, information on ink viscosity (e.g., "ink viscosity is low and has to be adjusted", "viscosity falls within an appropriate range", etc.) may be displayed. Also, additional information on date and time when viscosity adjustment was performed and, furthermore, information on date and time when previous viscosity adjustment was performed may also be displayed in the ink viscosity display field 80 provided on the operating and display unit 8, though not illustrated in FIG. 17.

<Advantageous Effects of the Embodiment Disclosed Herein>

According to the embodiment disclosed herein, while the inkjet recording apparatus remains inactive, the apparatus is arranged to spout out solvent from the print head and collect the solvent via the gutter and circulate ink inside the main body of the apparatus at intervals of a certain period of time after a time when the apparatus has been deactivated. Therefore, it can be prevented that ink sticks to solenoid valves and other components even when the inkjet recording apparatus remains inactive for a long time.

Also, according to the embodiment disclosed herein, the apparatus is arranged to measure viscosity of ink and, in an event when the viscosity has fallen outside a predetermined range, perform viscosity adjustment automatically depending on whether the viscosity is high or low. Therefore, when printing is performed, it is possible to supply the head with ink being in a condition in which ink viscosity is always kept within an appropriate range.

Particularly in an event when ink viscosity has become higher than a predetermined range, the ink viscosity can be adjusted to fall within an appropriate range, whereas only a part of ink contained in the main ink container has to be discarded. Therefore, there is no need to discard all the ink contained in the main ink container and replace it with new ink and, consequently, it would become possible to increase the effective usage amount of ink with reduced amount of discarded ink.

REFERENCE SIGNS LIST

1 . . . main body,
2 . . . print head,
3 . . . head receptacle unit,
4 . . . collection container,
5 . . . cable (for the print head),
6 . . . cable (for the head receptacle unit),
7 . . . control unit,
8 . . . operating and display unit
11 . . . belt conveyor,
12A . . . printing target objects,
12B . . . printing target objects,
13 . . . print head fixing bracket,
15 . . . display,
16 . . . head base,
17 . . . protective cover,
18 . . . start button,
19 . . . stop button,
20 . . . heater,
21 . . . nozzle,
23 . . . charging electrode,
24 . . . deflecting electrode,
24A . . . positive electrode,
24B . . . ground electrode,
25 . . . gutter,
26 . . . solenoid valve (for switchover),
27 . . . filter,
31 . . . main ink container,
31A, B, C . . . liquid level sensor,
32 . . . auxiliary ink container,
33 . . . solvent container,
34 . . . pump (for supply),
35 . . . pump (for collection),
36 . . . pump (for circulation),
37 . . . pump (for solvent),
38 . . . pressure sensor,
39 . . . filter (for supply),
40 . . . filter (for collection),
41 . . . filter (for nozzle cleaning),
43 . . . filter (for head cleaning),
45 . . . viscosity measuring instrument,
46 . . . pressure regulating valve,
48 . . . charge sensor,
49 . . . solenoid valve (for supply),
50 . . . solenoid valve (for collection),
53 . . . solenoid valve (for resupply of solvent),

54 . . . solenoid valve (for resupply of ink),
55 . . . solenoid valve (for nozzle cleaning),
56 . . . solenoid valve (for head cleaning),
57 . . . solenoid valve (for viscosity measurement),
58 . . . solenoid valve (for circulation in the main body),
59 . . . solenoid valve (for circulation),
60 . . . pump (for drying),
61 . . . pump (for suction),
62 . . . exhaust duct connection port,
68A . . . ink,
68B . . . ink particles,
68B1 . . . ink particles,
68C . . . ink,
69A . . . solvent,
70 . . . liquid,
74 . . . float,
75 . . . magnet,
76A, B . . . magnetic sensor,
81A . . . head holding part,
91 . . . fixing part,
92 . . . fixing jig (for the conveyor),
93 . . . fitting part
301 . . . . MPU,
302 . . . bus line,
306 . . . . ROM,
307 . . . . RAM,
311 . . . viscosity measurement circuit,
312 . . . pressure detection circuit,
313 . . . liquid level detection circuit,
314 . . . pump control circuit,
315 . . . solenoid valve driving circuit,
321 . . . pump control circuit,
322 . . . collection container sensor detection circuit,
323 . . . print head detection circuit,
324 . . . head receptacle unit detection circuit,
331 . . . excitation voltage generating circuit,
332 . . . deflection voltage generating circuit,
341 . . . phase search-use charging signal generating circuit,
342 . . . printing-use charging signal generating circuit,
343 . . . . D/A converter,
344 . . . amplifier circuit,
351 . . . phase decision circuit,
352 . . . . A/D converter,
353 . . . amplifier circuit,
600 . . . inkjet recording apparatus
801-803 . . . path (for supply),
806 . . . path (for resupply),
808 . . . path (for circulation in the main body),
811, 812 . . . path (for collection),
814 . . . path (for exhaust)
821, 822 . . . path (for circulation via the head),
824 . . . path (for viscosity measurement),
825 . . . path (for nozzle cleaning),
831 . . . path (for solvent supply),
833 . . . path (for resupply of solvent),
837 . . . path (for head cleaning),
841 . . . path (for air supply),
843 . . . path (for air suction),
901-903 . . . joint path,
921 . . . branch path.

The invention claimed is:

1. An inkjet recording apparatus comprising:

a print head which is equipped with a nozzle to discharge ink and prints on printing target objects;

a main body including an ink container in which ink to be supplied to the print head is contained, an auxiliary ink container which supplies the ink to the ink container, a solvent container in which a solvent is contained, a supply path equipped with a pump for supplying the ink from the ink container to the print head, a circulation path equipped with a pump for circulation to return a part of the ink supplied to the print head to the ink container, a collection path equipped with a pump for collection to suck the ink spouted out from the nozzle of the print head and collect the ink to the ink container, and a viscosity measurement unit which measures viscosity of the ink contained in the ink container;

a head receptacle unit in which the print head is put in place; and a control unit which controls the print head and the main body, wherein in an event when viscosity of the ink measured by the viscosity measurement unit has fallen outside a predetermined range set beforehand, the control unit controls the print head and the main body to make the viscosity of the ink fall within the predetermined range, in an event when viscosity of the ink measured by the viscosity measurement unit is higher than the predetermined range set beforehand, the control unit controls the print head and the main body, with the print head being put in place in the head receptacle unit, the control unit discards a part of the ink contained in the ink container flowing through the supply path and into the head receptacle unit via the print head, and the control unit supplies the solvent contained in the solvent container to the ink container so as to decrease the viscosity of the ink contained in the ink container.

2. The inkjet recording apparatus according to claim 1, wherein in an event when viscosity of the ink measured by the viscosity measurement unit is higher than the predetermined range set beforehand and the ink contained in the ink container is discarded via the ink head, the control unit modifies, depending on the viscosity of the ink measured by the viscosity measurement unit, the ink amount so that the liquid level of the ink contained in the ink container will become lower than a reference level of the ink which is set beforehand in the ink container, by discarding the ink via the print head.

3. The inkjet recording apparatus according to claim 2, wherein after the ink is discarded via the print head, the print head is cleaned with the solvent contained in the solvent container.

4. The inkjet recording apparatus according to claim 1, wherein in an event when viscosity of the ink measured by the viscosity measurement unit is lower than the predetermined range set beforehand, the control unit controls the print head and the main body to supply the ink from the auxiliary ink container to the ink container via the print head, thereby increasing the viscosity of the ink contained in the ink container.

5. The inkjet recording apparatus according to claim 1, wherein in an event when viscosity of the ink measured by the viscosity measurement unit has fallen outside the predetermined range set beforehand, the control unit controls the print head and the main body to make the viscosity of the ink fall within the predetermined range, while discharging the ink from the print head, stops the discharge of the ink from the print head after the viscosity of the ink falls within the predetermined range, and clean the circulation path with the solvent being supplied from the solvent container.

6. An inkjet recording apparatus comprising:

a print head which is equipped with a nozzle to discharge ink and prints on printing target objects;

a main body including an ink container in which ink to be supplied to the print head is contained, an auxiliary ink container which supplies the ink to the ink container, a solvent container in which a solvent is contained, a supply path equipped with a pump for supplying the ink from the ink container to the print head, a circulation path equipped with a pump for circulation to return a part of the ink supplied to the print head to the ink container, a collection path equipped with a pump for collection to suck the ink spouted out from the nozzle of the print head and collect the ink to the ink container, and a viscosity measurement unit which measures viscosity of the ink contained in the ink container;

a head receptacle unit in which the print head is put in place; and a control unit which controls the print head and the main body, wherein in an event when viscosity of the ink measured by the viscosity measurement unit has fallen outside a predetermined range set beforehand, the control unit controls the print head and the main body to make the viscosity of the ink fall within the predetermined range, and the main body further comprises an operating and display unit, and information on viscosity of the ink is displayed on the operating and display unit after viscosity of the ink falls within the predetermined range through control of the main body by the control unit.

7. The inkjet recording apparatus according to claim 6, wherein information on viscosity of the ink to be displayed on the operating and display unit comprises: information on viscosity of the ink whose viscosity falls outside the predetermined range set beforehand before adjustment is made of viscosity of the ink through control of the main body by the control unit; and information on viscosity of the ink after viscosity of the ink falls within the predetermined range through control of the main body by the control unit.

8. An inkjet recording apparatus comprising:

a print head which is equipped with a nozzle to discharge ink and prints on printing target objects;

a main body including an ink container in which ink to be supplied to the print head is contained, a solvent container in which a solvent is contained, a supply path to supply the ink from the ink container to the print head, a circulation path to return a part of the ink supplied to the print head to the ink container, and a collection path to suck the ink spouted out from the nozzle of the print head and collect the ink to the ink container; and a control unit which controls the print head and the main body, wherein during inactivity of printing on the printing target objects by the print head, the control unit controls the print head and the main body to perform repetitively supplying the solvent contained in the solvent container to the print head and letting the solvent flow back to the ink container through the circulation path and the collection path at intervals of a certain period of time during inactivity of the printing by the print head.

9. The inkjet recording apparatus according to claim 8, wherein the collection path is equipped with a solenoid valve for collection and a pump for collection and the control unit energizes the solenoid valve for collection at the intervals of a certain period of time during inactivity of printing on the printing target objects by the print head and actuates the pump for collection, while the solenoid valve for collection remains open, to let air flow from the print head into the ink container through the collection path, so that a solvent included in the ink contained in the ink container will be vaporized.

10. An inkjet recording apparatus management method, in a method for preventing ink from sticking during inactivity of printing by a print head, in an inkjet recording apparatus including: the print head which is equipped with a nozzle to discharge the ink and prints on printing target objects; a main body having an ink container in which the ink to be supplied to the print head is contained, a solvent container in which a solvent is contained, a supply path to supply the ink from the ink container to the print head, a circulation path to return a part of the ink supplied to the print head to the ink container, and a collection path to suck the ink spouted out from the nozzle of the print head and collect the ink to the ink container; and a control unit which controls the print head and the main body, the method comprising:

controlling the print head and the main body by the control unit, at intervals of a certain period of time during inactivity of the printing by the print head, and performing repetitively supplying the solvent contained in the solvent container to the print head and letting the solvent flow back to the ink container through the circulation path and the collection path at intervals of a certain period of time during inactivity of the printing by the print head, thereby preventing the ink from sticking.

11. The inkjet recording apparatus management method according to claim 10, wherein control by the control unit energizes a solenoid valve for collection provided in the collection path at the intervals of a certain period of time during inactivity of printing on the printing target objects by the print head and actuates the pump provided in the collection path, while the solenoid valve for collection remains open, to let air flow from the print head into the ink container through the collection path, so that a solvent included in the ink contained in the ink container will be vaporized.

12. An inkjet recording apparatus management method, in a method for managing viscosity of ink contained in an ink container in an inkjet recording apparatus including: a print head which is equipped with a nozzle to discharge the ink and prints on printing target objects; a main body having the ink container in which ink to be supplied to the print head is contained, an auxiliary ink container which supplies the ink to the ink container, a solvent container in which a solvent is contained, a supply path to supply the ink from the ink container to the print head, a circulation path to return a part of the ink supplied to the print head to the ink container, a collection path to suck the ink spouted out from the nozzle of the print head and collect the ink to the ink container, and a viscosity measurement unit which measures viscosity of the ink contained in the ink container; a head receptacle unit in which the print head is put in place; and a control unit which controls the print head and the main body, the method comprising:

controlling the print head and the main body by the control unit, in an event when viscosity of the ink measured by the viscosity measurement unit has fallen outside a predetermined range set beforehand, and adjusting the viscosity of the ink contained in the ink container, wherein in an event when viscosity of the ink measured by the viscosity measurement unit is higher than a predetermined range set beforehand, the control unit controls the print head and the main body, with the print head being put in place in the head receptacle unit, the control unit discards a part of the ink contained in the ink container flowing through the supply path and into the head receptacle unit via the print head, and the control unit supplies the solvent contained in the solvent container to the ink container so as to decrease the viscosity of the ink contained in the ink container.

13. The inkjet recording apparatus management method according to claim 12, wherein in an event when viscosity of the ink measured by the viscosity measurement unit is higher than a predetermined range set beforehand and the ink contained in the ink container is discarded via the ink head, the method modifies, depending on the viscosity of the ink measured by the viscosity measurement unit, the ink amount so that the liquid level of the ink contained in the ink container will become lower than a reference level of the ink which is set beforehand in the ink container, by discarding the ink via the print head.

14. The inkjet recording apparatus management method according to claim 12, wherein in an event when viscosity of the ink measured by the viscosity measurement unit is lower than a predetermined range set beforehand, the control unit controls the print head and the main body to supply the ink from the auxiliary ink container to the ink container via the print head, thereby increasing the viscosity of the ink contained in the ink container.

* * * * *